US011599232B2

(12) United States Patent
Kim et al.

(10) Patent No.: US 11,599,232 B2
(45) Date of Patent: *Mar. 7, 2023

(54) TOUCH SENSOR PANEL AND TOUCH INPUT DEVICE

(71) Applicant: HiDeep Inc., Seongnam-si (KR)

(72) Inventors: Bonkee Kim, Seongnam-si (KR); Seyeob Kim, Seongnam-si (KR); Jongsik Kim, Seongnam-si (KR)

(73) Assignee: HiDeep Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/420,429

(22) PCT Filed: Jan. 16, 2020

(86) PCT No.: PCT/KR2020/000784
§ 371 (c)(1),
(2) Date: Jul. 2, 2021

(87) PCT Pub. No.: WO2020/149658
PCT Pub. Date: Jul. 23, 2020

(65) Prior Publication Data
US 2022/0083174 A1    Mar. 17, 2022

(30) Foreign Application Priority Data
Jan. 17, 2019    (KR) .................. 10-2019-0006389

(51) Int. Cl.
*G06F 3/044*    (2006.01)
*G06F 3/041*    (2006.01)

(52) U.S. Cl.
CPC .......... *G06F 3/0446* (2019.05); *G06F 3/0416* (2013.01); *G06F 2203/04112* (2013.01)

(58) Field of Classification Search
None
See application file for complete search history.

(56) References Cited

U.S. PATENT DOCUMENTS

2010/0090979 A1    4/2010    Bae
2010/0149108 A1    6/2010    Hotelling et al.
(Continued)

FOREIGN PATENT DOCUMENTS

JP    2015509245 A    3/2015
JP    2015176602 A    10/2015
(Continued)

OTHER PUBLICATIONS

European Search Report 20741557.1, dated Sep. 6, 2022.

*Primary Examiner* — Stephen T. Reed
(74) *Attorney, Agent, or Firm* — The Belles Group, P.C.

(57) ABSTRACT

A touch sensor panel according to an embodiment of the present invention includes: a plurality of first electrodes and a plurality of second electrodes, in which a touch window area includes a first number of consecutive first electrodes in a first direction among the plurality of first electrodes and a second number of consecutive second electrodes in a second direction with respect to the first number of first electrodes, respectively, and a pair of a predetermined first electrode among the first electrodes included in the touch window area and a predetermined second electrode among the second electrodes do not exist in other window areas other than the touch window area.

16 Claims, 21 Drawing Sheets

(56) References Cited

U.S. PATENT DOCUMENTS

2013/0181942 A1     7/2013   Bulea
2017/0160833 A1     6/2017   Han
2021/0349572 A1*   11/2021   Kim .................... G06F 3/04164

FOREIGN PATENT DOCUMENTS

| JP | 2018060494 A | 4/2018 |
| KR | 20080081411 | 9/2008 |
| KR | 20130006296 | 1/2013 |
| KR | 20150114405 | 10/2015 |
| KR | 101651408 | 8/2016 |
| KR | 20170026977 | 3/2017 |
| WO | 2017076209 A1 | 5/2017 |
| WO | 2018225204 A1 | 12/2018 |

* cited by examiner

FIG. 2B

|  | Rx00 | Rx01 ↓S | Rx02 | Rx03 | Rx04 | Rx05 | Rx06 | Rx07 ↓S' | Rx08 | Rx09 | Rx10 | Rx11 |
|---|---|---|---|---|---|---|---|---|---|---|---|---|
| Tx00 | 25 | 2 | 22 | 16 | -2 | -2 | -18 | -28 | -21 | -25 | -32 | -10 |
| Tx01 | 24 | 85 | 79 | 29 | 0 | -4 | -37 | -81 | -72 | -13 | -12 | 0 |
| Tx02 | 118 | 181 | 146 | 133 | 2 | -10 | -120 | -124 | -126 | -94 | 9 | 3 |
| Tx03 | 157 | 171 | 151 | 167 | 46 | -8 | -135 | -126 | -132 | -122 | -26 | -1 |
| Tx04 | 139 | 116 | 122 | 122 | 69 | -8 | -130 | -128 | -160 | -131 | -18 | -6 |
| Tx05 | 137 | 115 | 118 | 110 | -27 | -9 | -114 | -132 | -148 | -117 | -12 | -7 |
| Tx06 | 34 | 84 | 86 | 48 | 16 | -2 | -32 | -97 | -60 | -27 | 0 | -6 |
| Tx07 | 18 | 23 | 29 | 18 | 43 | -6 | -19 | -38 | -29 | -16 | -2 | -6 |
| Tx08 | 3 | 4 | 5 | 1 | 1 | -1 | 0 | -3 | -3 | -6 | 0 | 0 |
| Tx09 | 0 | -3 | -1 | 6 | -1 | -1 | -6 | -8 | -1 | 2 | 7 | 2 |
| Tx10 | 2 | -2 | -5 | -2 | -4 | 1 | -8 | -5 | -5 | -8 | -1 | 3 |

(a)

(b)

(a)

(b)

TOUCH SENSOR PANEL AND TOUCH INPUT DEVICE

CROSS-REFERENCE TO RELATED PATENT APPLICATIONS

The present application is a U.S. national stage application under 35 U.S.C. § 371 of PCT Application No. PCT/KR2020/000784, filed Jan. 16, 2020, which claims priority to Korean Patent Application No. 10-2019-0006389, filed Jan. 17, 2019. The disclosures of the aforementioned priority applications are incorporated herein by reference in their entireties.

TECHNICAL FIELD

The present invention relates to a touch sensor panel and a touch input device, and more particularly, to a touch sensor panel and a touch input device, which prevent a negative final capacitance change amount from occurring by preventing a pair of a predetermined first electrode and a predetermine second electrode extracted to determine mutual capacitance in a touch window area from being present in other window areas other than the touch window area.

BACKGROUND ART

Various kinds of input devices are being used to operate a computing system. For example, input devices such as a button, a key, a joystick and a touch screen are used. Since the touch screen is easy and simple to operate, the touch screen is increasingly being used to operate the computing system.

The touch screen may constitute a touch surface of a touch input device including a touch sensor panel which may be a transparent panel including a touch-sensitive surface. The touch sensor panel is attached to a front side of a display screen, and then the touch-sensitive surface may cover a visible side of the display screen. The touch screen allows a user to operate the computing system by simply touching the touch screen by a finger, etc. Generally, the computing system recognizes the touch and a position of the touch on the touch screen and analyzes the touch, and thus, performs operations in accordance with the analysis.

The touch sensor panel applies a driving signal to the driving electrode and determines whether a touch is made from a signal input through a receiving electrode. The driving electrode and the receiving electrode may be formed on different layers or on the same layer. An example in which the driving electrode and the receiving electrode are formed on the same layer is US Patent Publication No. US2013/0181942. If the driving electrode and the receiving electrode are formed on different layers, cost increases, so it is preferable to form the driving electrode and the receiving electrode on the same layer. However, even if the driving electrode and the receiving electrode are implemented on the same layer, there is a need to reduce the number of wires, or by variously changing the electrode arrangement of the touch sensor panel with the reduced number of wires, it is necessary to reduce noise or suppress unnecessary signal generation.

In addition, there is a problem in that in the case of implementing the driving electrode and the receiving electrode on the same layer, a magnitude of a capacitance change amount finally detected by a low ground mass (LGM) interference signal generated when a device on which a touch sensor panel such as a smartphone is mounted is touched without holding the device with the hand is reduced, and as a result, it is necessary to overcome the problem.

In particular, when a '−' LGM interference signal occurs, a capacitance change amount finally obtained may has a value of '−', so it is necessary to overcome this and enhance an SNR.

DISCLOSURE

Technical Problem

The present invention is derived from the necessity described above, and an object of the present invention is to enhance touch sensitivity without generating a negative (minus) final capacitance change amount.

Further, an object of the present invention is to manufacture a touch sensor panel to be slimmer and reduce even manufacturing cost by reducing the number of traces.

Technical Solution

A touch sensor panel according to an embodiment of the present invention may include: a plurality of first electrodes and a plurality of second electrodes, in which a touch window area may include a first number of consecutive first electrodes in a first direction among the plurality of first electrodes and a second number of consecutive second electrodes in a second direction with respect to the first number of first electrodes, respectively, and a pair of a predetermined first electrode among the first electrodes included in the touch window area and a predetermined second electrode among the second electrodes may not exist in other window areas other than the touch window area.

The predetermined first electrode and the predetermined second electrode may be arranged to be spaced apart by a predetermined distance.

The touch sensor panel may include a plurality of first electrode arrays including the plurality of first electrodes and a plurality of second electrode arrays including the plurality of second electrodes and arranged alternatively with the plurality of first electrode arrays, at least two of the second electrodes included in the second electrode array which is any one of the plurality of second electrode arrays may be arranged to correspond to any one of the first electrodes included in the first electrode array which is any one of the plurality of first electrode arrays, and any one of the second electrodes included in the second electrode array may be connected to some of the remaining second electrodes other than the any one second electrode among the second electrodes by using one second trace.

In the touch sensor panel, second electrodes arranged adjacent to a left side and a right side in the same row around any one of the first electrodes included in the first electrode array may be connected by using one second trace.

Second electrodes arranged adjacent to the left side and the right side in the same row around any one of the first electrodes included in the first electrode array may be connected by using different second traces, respectively.

The other window area may include an adjacent touch area adjacent to the touch window area in a column direction, and any one second electrode of the second electrodes included in the touch window area among the second electrodes included in the second electrode array may be connected to a second electrode arranged at a location symmetrical to the any one second electrode among the second electrodes included in the adjacent touch area by one second trace.

First electrodes arranged adjacent to the left side and the right side in the same row around any one of the second electrodes included in the second electrode array may be connected by using one first trace.

First electrodes arranged adjacent to the left side and the right side in the same row around any one of the second electrodes included in the second electrode array may be connected by using different first traces, respectively.

The other window area may include an adjacent touch area adjacent to the touch window area in a column direction, and any one second electrode of the second electrodes included in the touch window area among the second electrodes included in the second electrode array may be connected to a second electrode arranged at a location symmetrical to the any one second electrode among the second electrodes included in the adjacent touch area by one second trace.

The other window area may include an adjacent touch area adjacent to the touch window area in a column direction, and any one second electrode of the second electrodes included in the touch window area among the second electrodes included in the second electrode array may be connected to a second electrode arranged at a location corresponding to the any one second electrode among the second electrodes included in the adjacent touch area by one second trace.

A value acquired by multiplying the number of unit cells constituting at least one first electrode connected to a first trace among the first electrodes included in the touch window area and the number of unit cells constituting at least one second electrode connected to a second trace among the second electrodes included in the touch window area may be less than a predetermined value.

The predetermined value may be 16.

A touch sensor panel according to an embodiment of the present invention may include: a plurality of first electrodes and a plurality of second electrodes, in which a touch sensor area may be constituted by first electrodes included in a first length among the plurality of first electrodes and second electrodes included in a second length among the plurality of second electrodes, and a pair of a predetermined first electrode among the first electrodes included in the touch window area and a predetermined second electrode among the second electrodes may not exist in other window areas other than the window area.

The predetermined first electrode and the predetermined second electrode may be arranged to be spaced apart by a predetermined distance.

Each of the first length and the second length may be 16 mm.

Advantageous Effects

It is possible to enhance touch sensitivity without generating a negative final capacitance change amount.

By reducing the number of traces, a touch sensor panel can be manufactured to be slimmer, and manufacturing cost can be reduced.

DESCRIPTION OF DRAWINGS

FIGS. 2A and 2B are diagrams referred to for describing a final capacitance change amount of '−' which occurs on a touch sensor panel in which a driving electrode and a receiving electrode are arranged on the same layer.

MODE FOR INVENTION

Figure 1A:
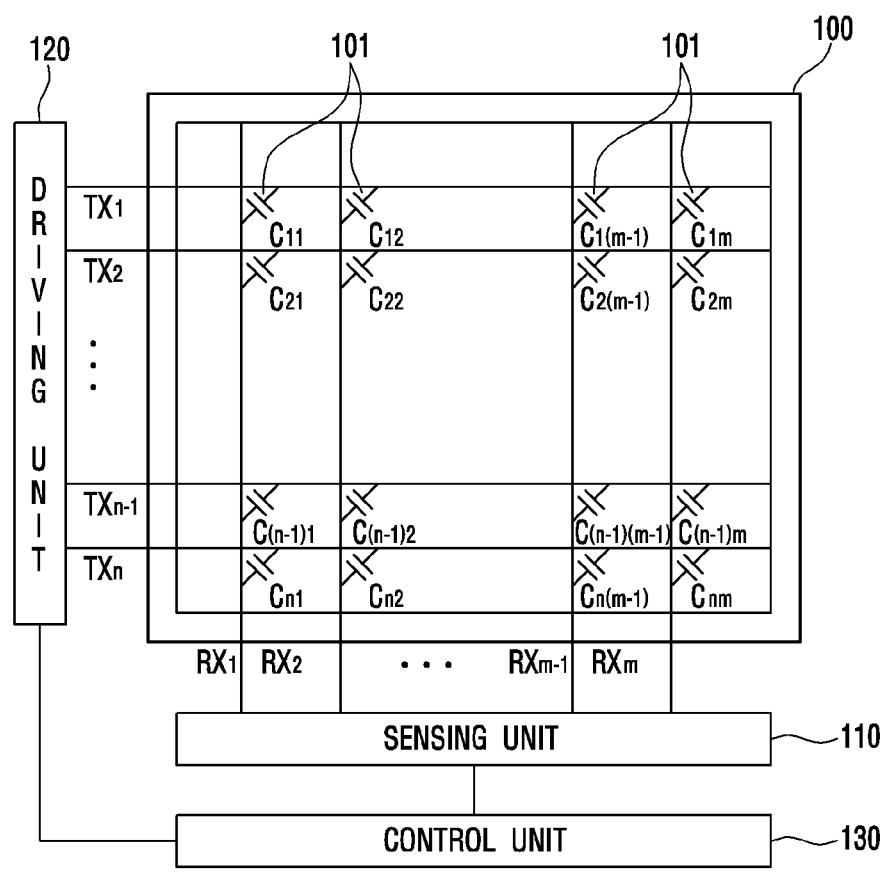
FIG. 1A is a configuration diagram of a touch sensor panel.

The following detailed description of the present invention will be made with reference to the accompanying drawings which illustrate a specified embodiment in which the present invention may be implemented as an example. The embodiment will be described in detail enough so that those skilled in the art are able to embody the present invention. It should be understood that various embodiments of the present invention are different from each other and need not be mutually exclusive. For example, specific shapes, structures, and characteristics described herein may be implemented in other embodiments without departing from the spirit and scope of the present invention in relation to one embodiment. In addition, it is to be understood that the location or arrangement of individual components within each disclosed embodiment may be changed without departing from the spirit and scope of the present invention. Accordingly, the detailed description to be described below is not intended to be taken in a limiting sense, and the scope of the present invention, if properly described, is limited only by the appended claims, along with all scopes equivalent to those claimed by the claims. Similar reference numerals in the drawings designate the same or similar functions in many aspects.

Hereinafter, a touch input device 1000 according to an embodiment of the present invention will be described with reference to the accompanying drawings. Hereinafter, a capacitive touch sensor panel 1 is exemplified below, but the present invention may be applied even to the touch sensor panel 1 capable of detecting a touch position in any method in the same/similar manner.

FIG. 1A is a schematic diagram of a capacitive touch sensor 10 included in a touch sensor panel 1 of a general touch input device 1000 and a configuration for operation thereof. Referring to FIG. 1A, the touch sensor 10 may include a plurality of driving electrodes TX1 to TXn and a plurality of receiving electrodes RX1 to RXm, and may include a driving unit 12 which applies a driving signal to the plurality of driving electrodes TX1 to TXn for the purpose of the operation of the touch sensor 10, and a sensing unit 11 which detects a touch and/or a touch position by receiving a sensing signal including information on a capacitance change amount changing according to the touch on a touch surface from the plurality of receiving electrodes RX1 to RXm.

As illustrated in FIG. 1A, the touch sensor 10 may include the plurality of driving electrodes TX1 to TXn and the plurality of receiving electrodes RX1 to RXm. While FIG. 1A illustrates that the plurality of driving electrodes TX1 to TXn and the plurality of receiving electrodes RX1 to RXm of the touch sensor 10 form an orthogonal array, the present invention is not limited thereto and the plurality of driving electrodes TX1 to TXn and the plurality of receiving electrodes RX1 to RXm may have arbitrary numbers of dimensions including a diagonal array, a concentric array, a 3-dimensional random array, etc., and an application array thereof. Here, "n" and "m" which are positive integers may be the same as each other or may be different from each other and magnitudes of n and m may be changed depending on the embodiment.

The plurality of driving electrodes TX1 to TXn and the plurality of receiving electrodes RX1 to RXm may be arranged to cross each other. The driving electrode TX may include the plurality of driving electrodes TX1 to TXn extending in a first axial direction and the receiving electrode RX may include the plurality of receiving electrodes RX1 to RXm extending in a second axial direction crossing the first axial direction.

Figure 1B:
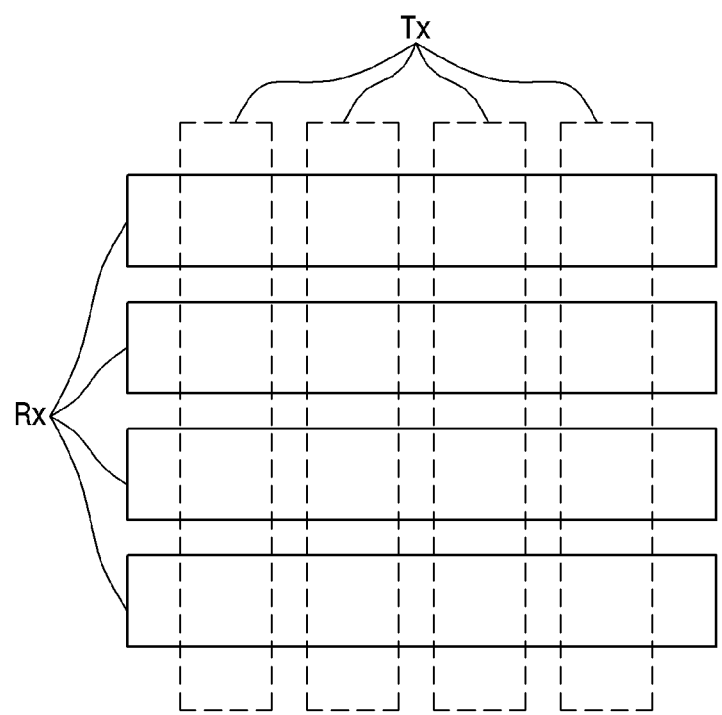
FIGS. 1B to 1D are diagrams illustrating an arrangement form of touch sensors implemented on different layers or touch sensors implemented on the same layer.

As illustrated in FIG. 1B, the plurality of driving electrodes TX1 to TXn and the plurality of receiving electrodes RX1 to RXm may be formed on different layers. For example, one of the plurality of driving electrodes TX1 to TXn and the plurality of receiving electrodes RX1 to RXm may be formed on an upper surface of a display panel (not illustrated), and the other one may be formed on a lower surface of a cover to be described later or in the display panel (not illustrated).

Figure 1C:
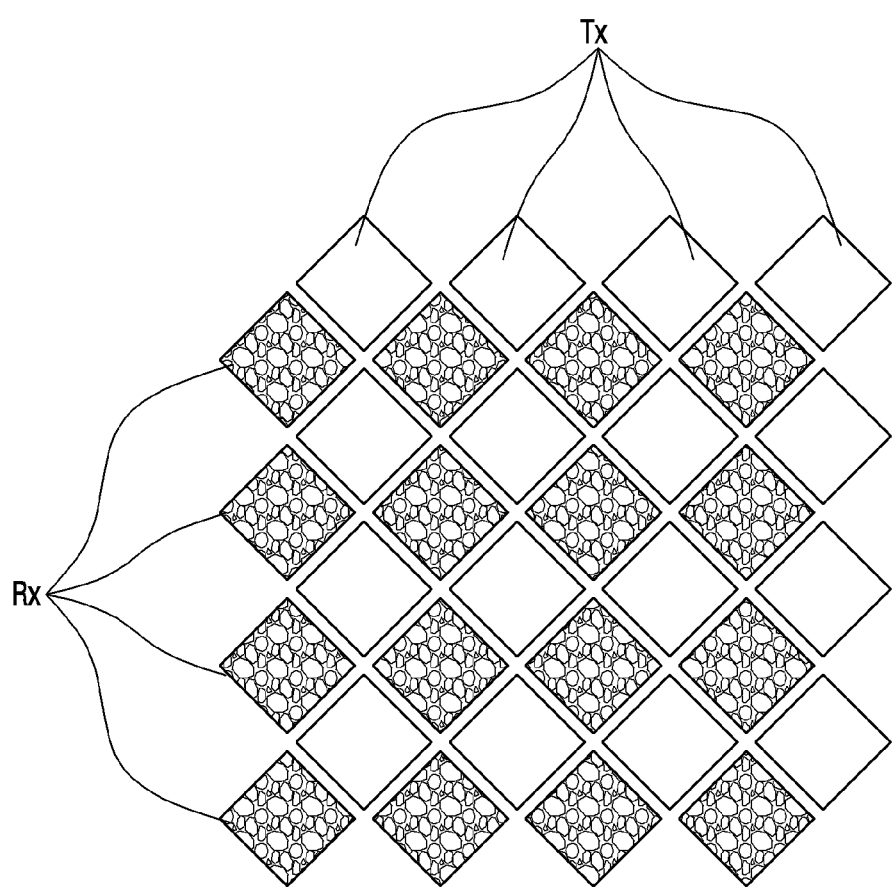
Figure 1D:
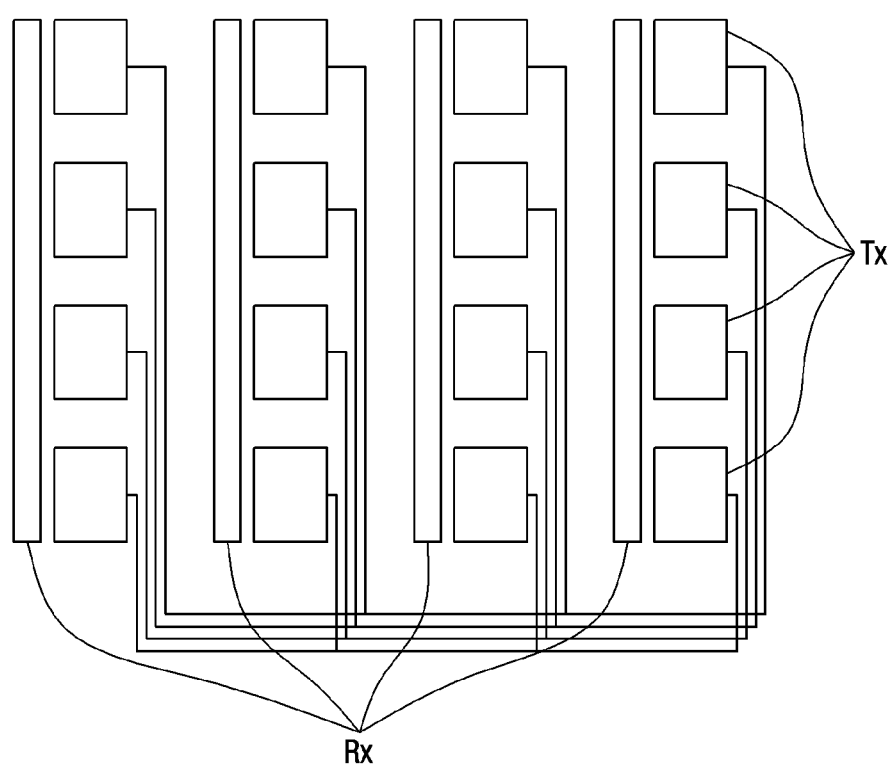

Further, as illustrated in FIGS. 1C and 1D, in the touch sensor 10 according to the embodiment of the present invention, the plurality of driving electrodes TX1 to TXn and the plurality of receiving electrodes RX1 to RXm may be formed in the same layer. For example, the plurality of driving electrodes TX1 to TXn and the plurality of receiving electrodes RX1 to RXm may be formed on the top of the display panel.

The plurality of driving electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example and the driving electrode TX and the receiving electrode RX may also be made of another transparent conductive material or an opaque conductive material. For instance, the driving electrode TX and the receiving electrode RX may be formed to include at least any one of silver ink, copper, nano silver or carbon nanotube (CNT). Further, the driving electrode TX and the receiving electrode RX may be implemented by a metal mesh.

The driving unit 12 according to an embodiment of the present invention may apply a driving signal to the driving electrodes TX1 to TXn. In an embodiment of the present invention, one driving signal may be sequentially applied to one driving electrode at a time from the first driving electrode TX1 to the n-th driving electrode TXn. The driving signal may be applied again repeatedly. This is only an example and the driving signals may be applied to the plurality of driving electrodes at the same time in accordance with the embodiment.

Through the receiving electrodes RX1 to RXm, the sensing unit 11 receives the sensing signal including information on a capacitance (Cm) 14 generated between the receiving electrodes RX1 to RXm and the driving electrodes TX1 to TXn to which the driving signal has been applied, thereby detecting whether the touch has occurred and where the touch has occurred. For example, the sensing signal may be a signal obtained by coupling the driving signal applied to the driving electrode TX by the capacitance (CM) 14 generated between the driving electrode TX and the receiving electrode RX. As such, the process of sensing the driving signal applied from the first driving electrode TX1 to the n-th driving electrode TXn through the receiving electrodes RX1 to RXm may be referred to as a process of scanning the touch sensor 10.

For example, the sensing unit 11 may include a receiver (not illustrated) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. In this case, the positive (+) input terminal of the amplifier may be connected to the ground. Further, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 14, and then converts the integrated current signal into voltage. The sensing unit 11 may further include an analog-to-digital converter (ADC) (not shown) which converts the integrated data by the receiver into digital data. Later, the digital data may be input to a processor (not illustrated) and processed to obtain information on the touch on the touch sensor 10. The sensing unit 11 may include the ADC and the processor as well as the receiver.

The control unit 13 may perform a function of controlling the operations of the driving unit 12 and the sensing unit 11. For example, the control unit 13 generates and transmits a driving control signal to the driving unit 12, so that the driving signal may be applied to a predetermined driving electrode TX at a predetermined time. Further, the control unit 13 generates and transmits the sensing control signal to the sensing unit 11, so that the sensing unit 11 may receive the sensing signal from the predetermined receiving electrode RX at a predetermined time and perform a predetermined function.

In FIG. 1A, the driving unit 12 and the sensing unit 11 may constitute a touch detection device (not illustrated) capable of detecting whether the touch has occurred on the touch sensor 10 and/or where the touch has occurred. The touch detection device may further include the control unit 13. The touch detection device may be implemented by being integrated on a touch sensing integrated circuit (IC). The driving electrode TX and the receiving electrode RX included in the touch sensor 10 may be connected to the driving unit 12 and the sensing unit 11 included in the touch sensing IC through, for example, a conductive trace and/or a conductive pattern printed on a circuit board, or the like. The touch sensing IC may be located on a circuit board on which the conductive pattern is printed, e.g., a touch circuit board (hereinafter, referred to as a touch PCB). According to an embodiment, the touch sensing IC may be mounted on a main board for operation of the touch input device 1000.

As described above, a capacitance (Cm) with a predetermined value is generated at each crossing point of the driving electrode TX and the receiving electrode RX and when an object like a finger approaches the touch sensor 10, the value of the capacitance may be changed. In FIG. 1A, the capacitance may represent a mutual capacitance (Cm). The sensing unit 11 senses such electrical characteristics to sense whether the touch on the touch sensor 10 is made and/or a touch position. For example, the sensing unit 110 is able to sense whether the touch occurs on the surface of the touch sensor 10 comprised of a two-dimensional plane consisting of a first axis and a second axis and/or the position thereof.

More specifically, when the touch occurs on the touch sensor 10, the driving electrode TX to which the driving signal has been applied is detected, so that the position of the second axial direction of the touch may be detected. Likewise, when the touch occurs on the touch sensor 10, the capacitance change is detected from the reception signal received through the receiving electrode RX, so that the position of the first axial direction of the touch can be detected.

Hereinafter, a signal other than the capacitance change amount that reduces the SNR that is generated when an object touches the touch sensor panel 1 and a combination of electrode arrangements of the various touch sensor panels 1 to enhance the related touch sensitivity will be described.

A location on the touch sensor panel 1, which is touched by the object, is determined based on the final capacitance change amount (ΔCtotal) obtained as the object touches the touch sensor panel 1. The final capacitance change amount (ΔCtotal) is constituted by only '+' capacitance value (ΔCm, e.g., +250) in the normal situation in which the low ground mass (LGM) interference signal is not generated, but a lower final capacitance change amount (ΔCtotal, e.g., 50) is obtained by the LGM interference signal ($C_{LGM}$, e.g., −200) in the situation in which the LGM interference signal is generated. That is, the LGM interference signal is defined as a signal that acts opposite to the '+' capacitance value, thereby reducing the finally obtained capacitance change amount (ΔCtotal).

Figure 2A:
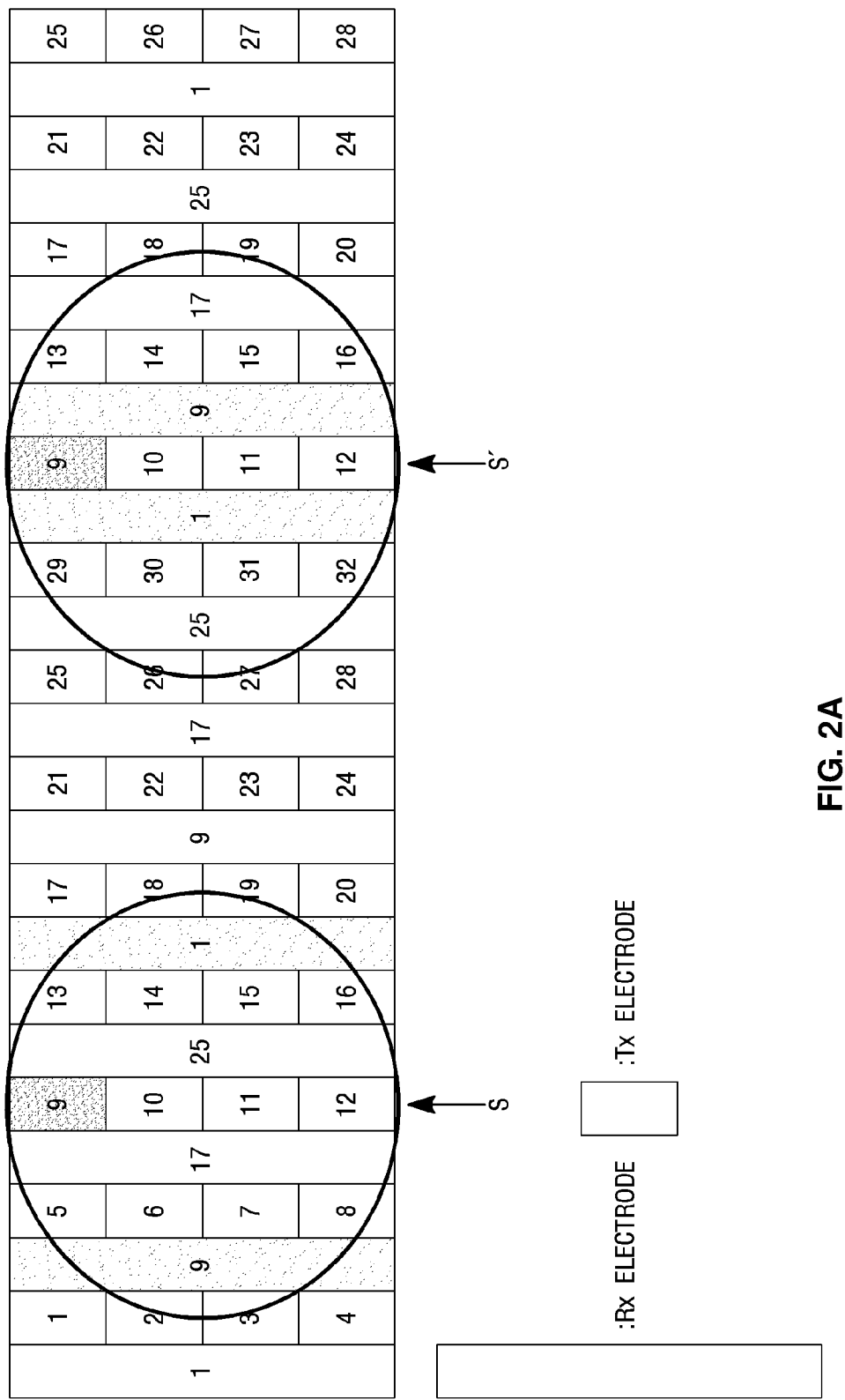

On the other hand, as illustrated in FIGS. 2A and 2B, it can be seen that when the object touches a predetermined position S on the touch sensor panel 1 in which the driving electrode and the receiving electrode are arranged on the same layer, the final capacitance change amount (ΔCtotal) obtained at another position S' spaced apart from the touched position S is '−' (minus). That is, when the touch by the object occurs at the touched position S, '+' final capacitance change amount (ΔCtotal) is obtained, whereas '−' (minus, hereinafter, simply referred to as only '−') final capacitance change amount (ΔCtotal) at another position S' spaced apart from the touched position is obtained. As a specific example, a reason for the phenomenon is as follows.

For example, it can be seen that in the case of the driving electrode TX9 included in the predetermined position S touched by the object, '+' capacitance value is obtained between the driving electrode TX9 and the receiving electrode RX17 arranged immediately adjacent to the driving electrode TX9 and between the driving electrode TX9 and another receiving electrode RX25 arranged immediately adjacent to the driving electrode TX9, but final capacitance change amount (ΔCtotal, e.g., −200) is obtained in a state (i.e., in a state in which '+' capacitance value is '0') in which the '+' capacitance value is not obtained) between the driving electrode TX9 and the receiving electrode RX9 arranged spaced apart from the driving electrode TX9 by a predetermined distance and between the driving electrode TX9 and another receiving electrode RX1 arranged space apart from the driving electrode TX9 by a predetermined distance. The reason is that the '+' capacitance value is not obtained between the driving electrode and the receiving electrode which are not immediately adjacent to each other, and it may be determined that based on obtaining of the final capacitance change amount (ΔCtotal, e.g., −200), the '−' LGM interference signal ($C_{LGM}$, e.g., −200) corresponding to the final capacitance change amount is generated at a position other than the touched position S.

The reason for generating the '−' LGM interference signal occurs when the driving electrode TX9 and the receiving electrodes RX9 and RX1 which are not adjacent to each other at the predetermined touch position S are adjacent to each other at another position S' as illustrated in FIG. 2A.

In other words, it means that a predetermined coordinate combination of the driving electrode and the receiving electrode extracted to determine mutual capacitance at a predetermined touch position S should not be repeated identically in other areas of the touch sensor panel 1.

Hereinafter, a combination of electrodes in various touch sensor panels 1 implemented so that the '−' LGM interference signal described in FIG. 2 is not generated will be described.

For reference, it is exemplified that in the touch sensor panel 1 in FIGS. 3 to 6, electrodes are implemented on the same layer.

FIG. 3 is a diagram referenced for describing an arrangement form of electrodes in a touch sensor panel 1 according to a first embodiment of the present invention.

Figure 3A:
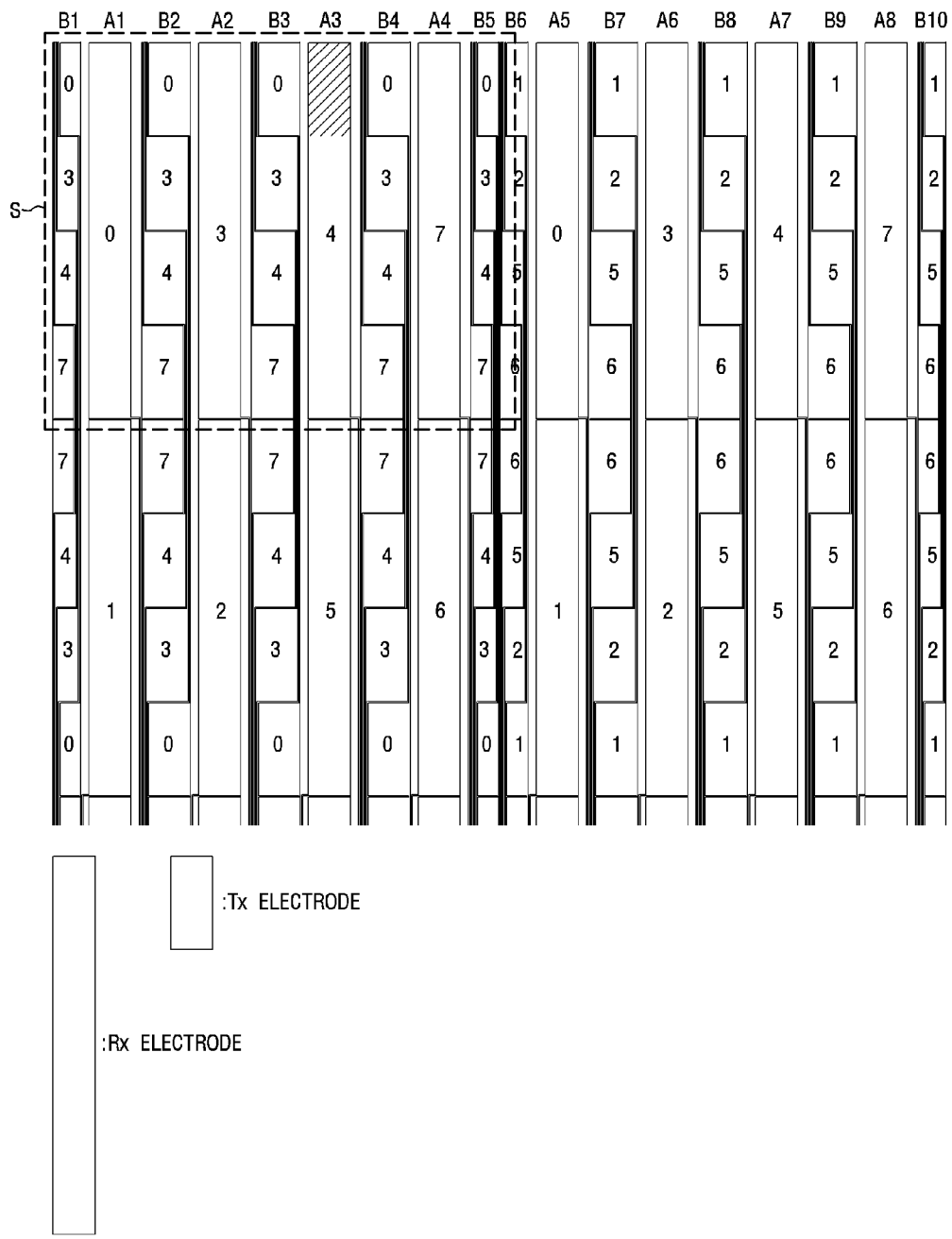
FIG. 3 is diagram referenced for describing an arrangement form of electrodes in a touch sensor panel according to a first embodiment of the present invention.

As illustrated in FIG. 3A, a touch sensor panel 1 according to a first embodiment of the present invention may include a plurality of first electrode arrays A1 to A8 and a plurality of second electrode arrays B1 to B10 extended in a column direction. In addition, as a whole, the first electrode arrays A1 to A8 and the plurality of second electrode arrays B1 to B10 may be arranged to cross each other. However, some second electrode arrays B5 and B6 may be continuously disposed between the first electrode arrays A4 and A5.

The plurality of first electrode arrays A1 to A8 may include a plurality of first electrodes RX0 to RX7, and the plurality of second electrode arrays B1 to B10 may include a plurality of second electrodes TX0 to TX7. In FIG. 3A, it is exemplified that the plurality of first electrodes RX0 to RX7 are sequentially arranged with a row direction as a priority, and the plurality of second electrodes TX0 to TX7 are also sequentially arranged with the column direction as the priority, but the scope of the present invention is not limited thereto.

However, FIG. 3A illustrates some of all touch sensor panels 1, and the remaining first electrodes and the remaining second electrodes may be further arranged in the row direction and the column direction. Further, in FIG. 3A, a first electrode having a relatively large size is assumed as the receiving electrode, and a second electrode having a relatively small size is assumed as the driving electrode, but the scope of the present invention is not limited thereto, and even though the first electrode is defined as the driving electrode and the second electrode is defined as the receiving electrode, the electrodes may be applied to the present invention in the same/similar manner.

In FIG. 3A, it illustrated that the electrode and the trace are separated from each other and formed as separate components, but according to an embodiment, the electrode and the trace may be integrated and formed in the form of a metal mesh. In this case, a dead zone in which the touch position such as between the electrode and the trace and/or between the electrode and another electrode is not detected is reduced, so that the sensitivity of detection of the touch position may be further enhanced. In any one RX0 of the first electrodes RX0 and RX1 included in the first electrode array A1 which is any one of the plurality of first electrode arrays A1 to A8, at least two of the second electrodes TX0, TX3, TX4, and TX7 included in the second electrode array B2 which is any one of the plurality of second electrode arrays B1 to B10 may be arranged to be correspondingly adjacent to each other. However, this is not applied only to the first electrode array A1 and may be applied even to the remaining first electrode arrays A2 to A8 in the same/similar manner. Further, this is not applied only to the first electrode RX0 and may be applied even to the remaining first electrode RX1 in the same/similar manner.

Any one RX0 of the first electrodes RX0 and RX1 included in the first electrode array A1 may be connected to some (the first electrode RX0 included in the first electrode array A5) of the remaining first electrodes other than any one first electrode (the first electrode RX0 included in the first electrode array A1) of the plurality of first electrodes RX0 to RX7 included in the touch sensor panel 1 through the same channel.

Any one TX0 of the second electrodes TX0, TX3, TX4, and TX7 included in the second electrode array B2 may be connected to at least some (the second electrode TX0 included in the second electrode arrays B1 and B3 to B5) of the remaining second electrodes other than any one second electrode (the second electrode TX0 included in the second electrode array B2) of the plurality of second electrodes TX0 to TX7 included in the touch sensor panel 1 through the same channel.

For example, even if separate traces are directly connected to each of the same first electrodes (RX0 in column A1 and RX0 in column A5), the separate traces may be combined into one trace again and consequently connected to one receiving terminal. In addition, even if the separate traces are directly connected to each of the same second electrodes (TX0 in column B1 to TX0 in column B5), the separate traces may be combined into one trace again and consequently connected to one driving terminal.

According to the structure of the touch sensor panel 1 of FIG. 3, a plurality of driving electrodes are connected to one driving terminal, and a plurality of receiving electrodes are connected to one receiving terminal, thereby reducing the number of traces.

In particular, at least two of the second electrodes TX0, TX3, TX4, and TX7 are arranged adjacent to the first electrode RX0 and at least two of other second electrodes TX7, TX4, TX3, and TX0 are arranged to be correspondingly adjacent to the other first electrode RX1, and then electrodes of the same number among the second electrodes TX0, TX3, TX4, and TX7 and other second electrodes TX7, TX4, TX3, and TX0 are connected by using one second trace, and as a result, the number of traces may be reduced compared to a structure in which a plurality of driving electrodes corresponding to one receiving electrode are connected by different traces as illustrated in FIG. 1D.

Meanwhile, some first electrodes RX0, RX3, RX4, and RX7 included in the touch window area S among the plurality of first electrodes RX0 to RX7 of the touch sensor panel 1 may be connected to different first traces, respectively.

All of the first electrodes RX0, RX3, RX4, and RX7 included in the touch window area S are separated from each other and connected using different first traces to reduce the aforementioned LGM interference signal, thereby enhancing the touch sensitivity.

For reference, a case where the LGM interference signal is generated and an electrode arrangement form of the touch sensor panel 1 for reducing the generated LGM interference signal will be described below with reference to FIGS. 7 and 8.

Figure 7A:
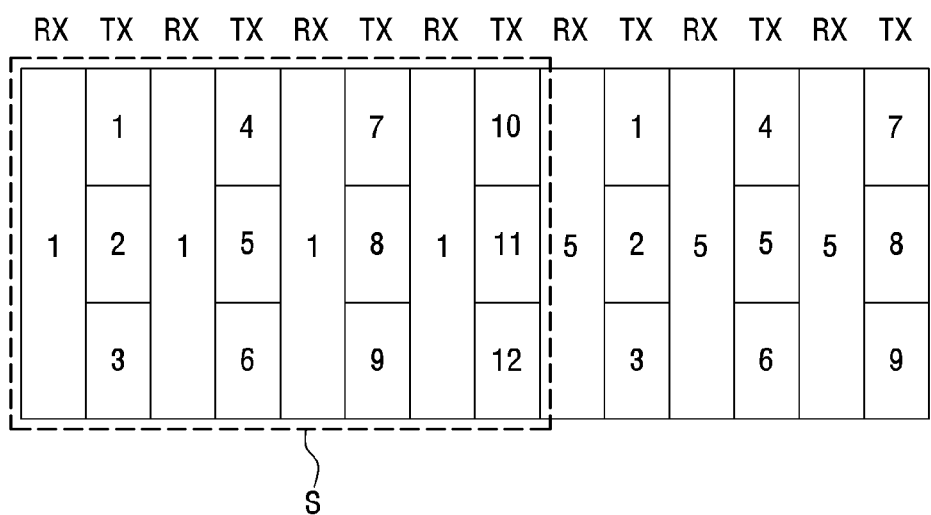
FIGS. 7 and 8 are diagrams referred for describing a generation principle of an LGM interference signal.

FIG. 7A illustrates an electrode arrangement form in which a plurality of the same receiving electrodes RX1 are arranged in the touch window area S so that a generation amount of the LGM interference signal is relatively increased. In the present invention, the same receiving electrodes refer to receiving electrodes connected to one trace by the same sensing terminal, and the same driving electrodes refer to driving electrodes connected to one trace by the same driving terminal.

Figure 7B:
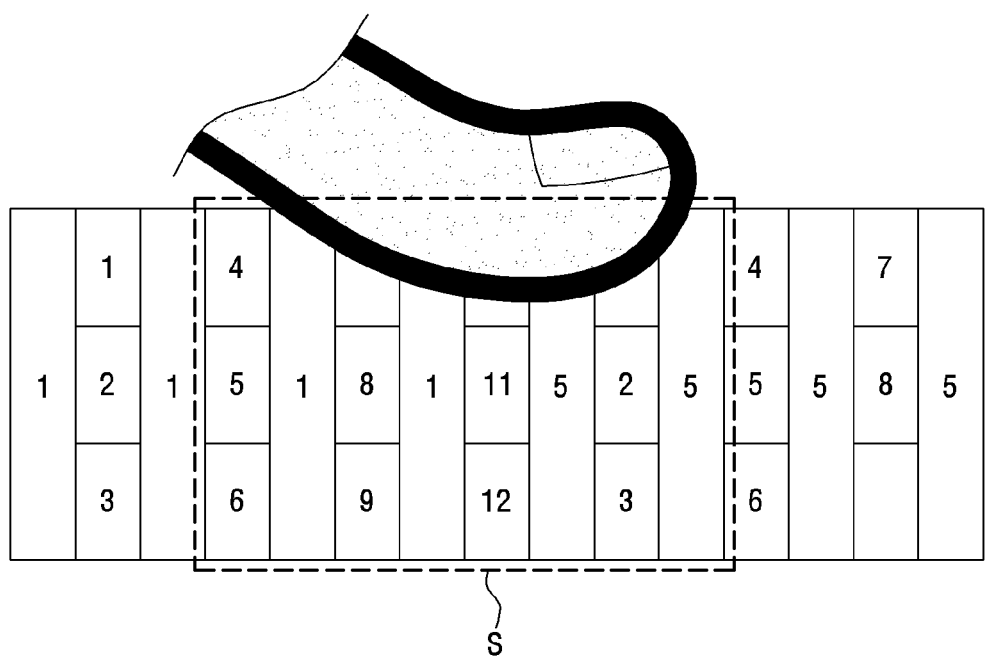
Figure 7C:
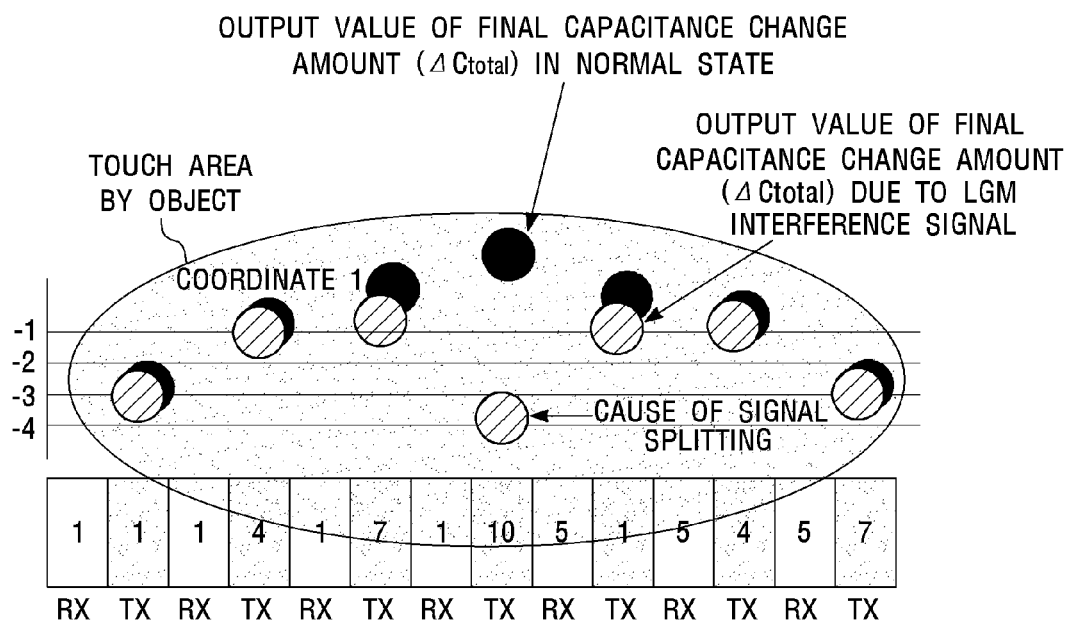

In this case, as illustrated in FIG. 7B, when the surface of the touch sensor panel 1 is touched with the thumb, in a normal situation in which the low ground mass (LGM) interference signal is not generated as illustrated in FIG. 7C in a finger touch area (touch window area S), a final capacitance change amount ($\Delta C$total) is constituted by only '+' capacitance value ($\Delta C$m, e.g., +250), but in a situation in which the LGM interference signal is generated, a lower final capacitance change amount ($\Delta C$total, e.g., 50) is obtained by '−' LGM interference signal ($C_{LGM}$, e.g., −200). That is, the LGM interference signal is defined as a signal that acts opposite to the '+' capacitance value, thereby reducing the finally obtained capacitance change amount ($\Delta C$total).

Here, the normal situation exemplifies a situation in which a user touches the surface of the touch input device 1000 while gripping the touch input device 1000 and the finger acts as a normal ground. In addition, the situation in which the LGM interference signal is generated exemplifies a situation in which the surface of the touch input device 1000 is touched while the touch input device 1000 is placed on the floor and floating occurs, and as a result, the finger does not act as the normal ground.

Figure 7D:
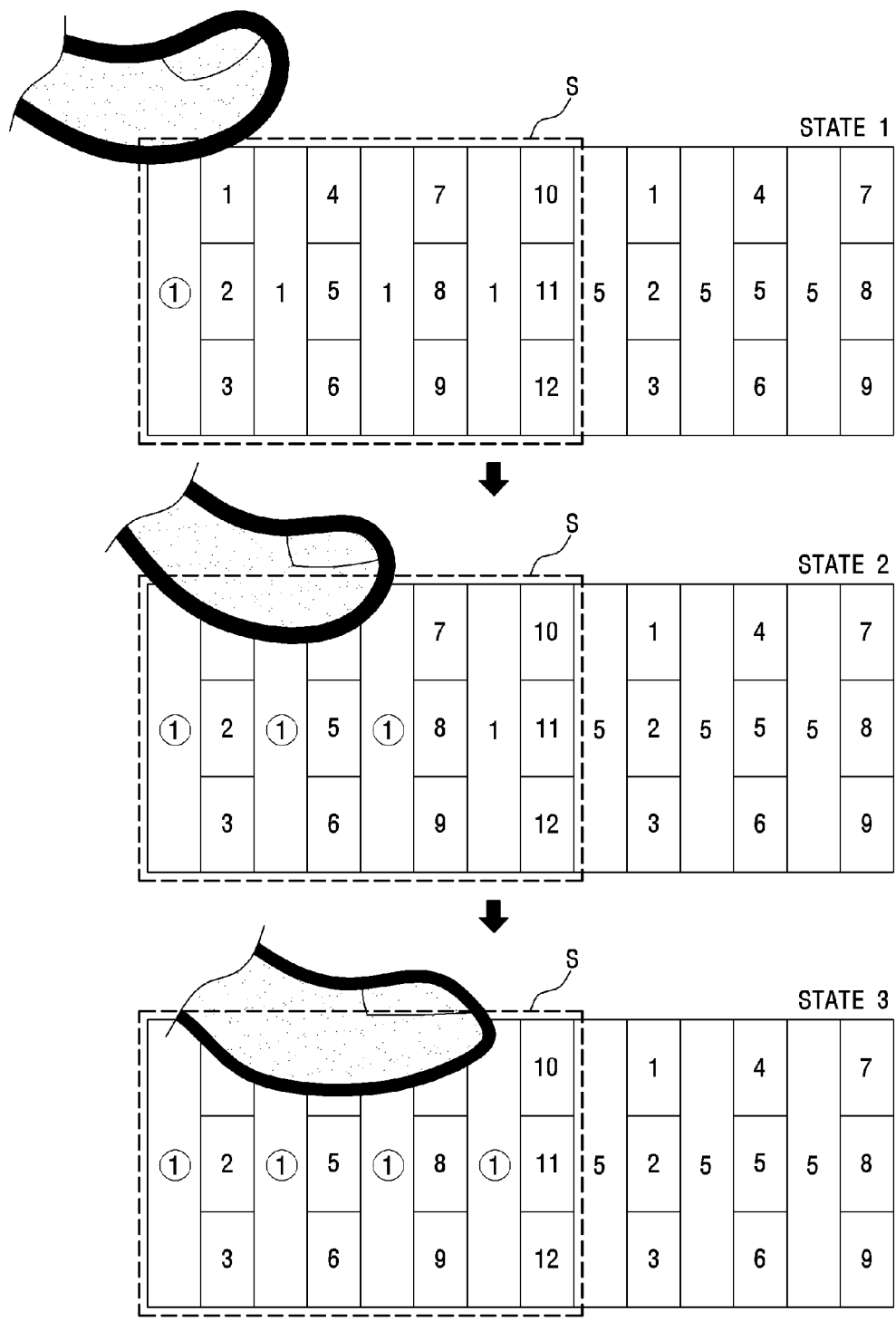

For example, FIG. 7D illustrates a situation in which as a touch area of the thumb increases gradually, the number of the same receiving electrodes RX1 included in the corresponding touch area gradually increases (1 in state 1→3 in state 2→4 in state 3).

In the finger touch area, the final capacitance change amount ($\Delta C$total) is constituted by only '+' capacitance value ($\Delta C$m, e.g., >+250) in the normal situation in which the LGM interference signal is not generated, but the final capacitance change amount ($\Delta C$total) almost disappears in the situation in which the LGM interference signal is largely generated. As such, as the number of the same receiving electrodes RX1 included in the finger touch area increases, a magnitude of the LGM interference signal gradually increases, and as a result, it can be seen that the final capacitance change amount $\Delta C$total almost disappears.

Figure 8A:
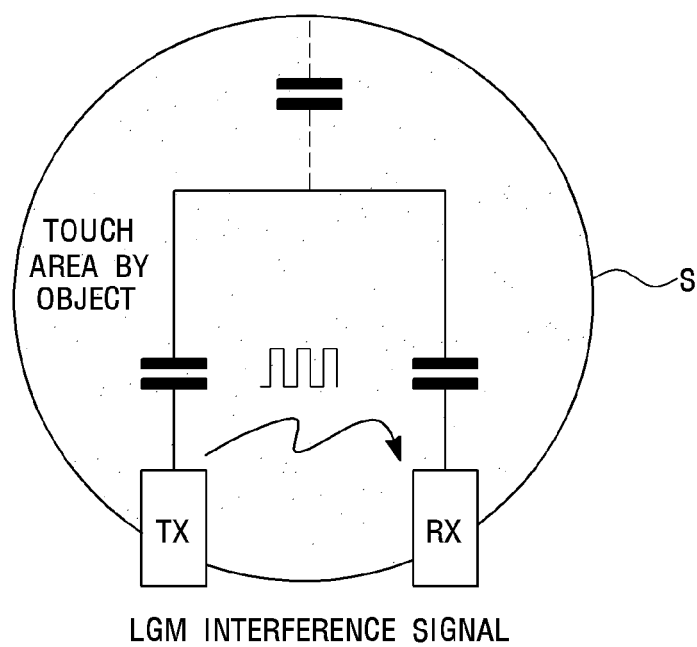

As a result, as illustrated in FIG. 8A, when the driving electrode and the receiving electrode are connected to a conductive object with a low ground, a separate current path is generated, and the TX signal is transmitted to the RX electrode through the path, and as a result, the LGM interference signal opposite to the normal touch signal is generated.

Figure 8B:
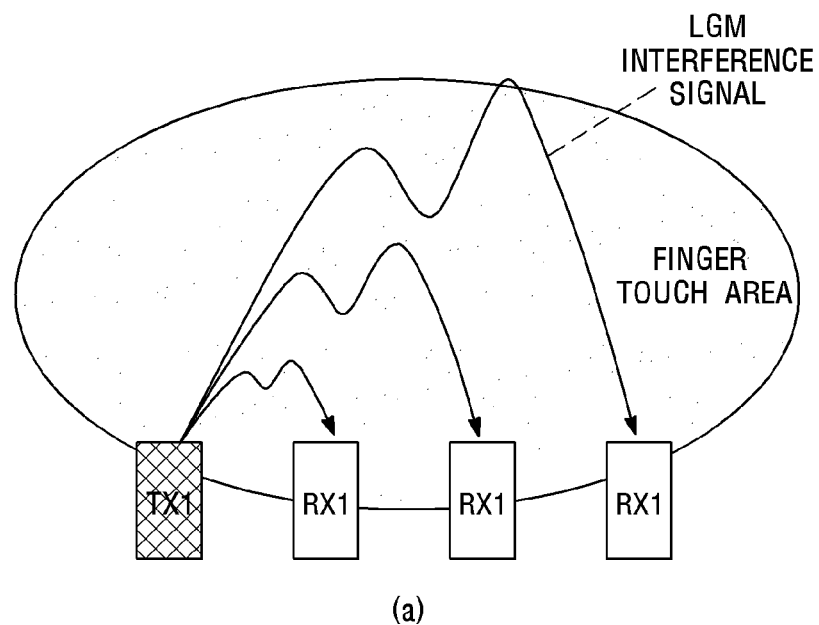
Figure 8B:
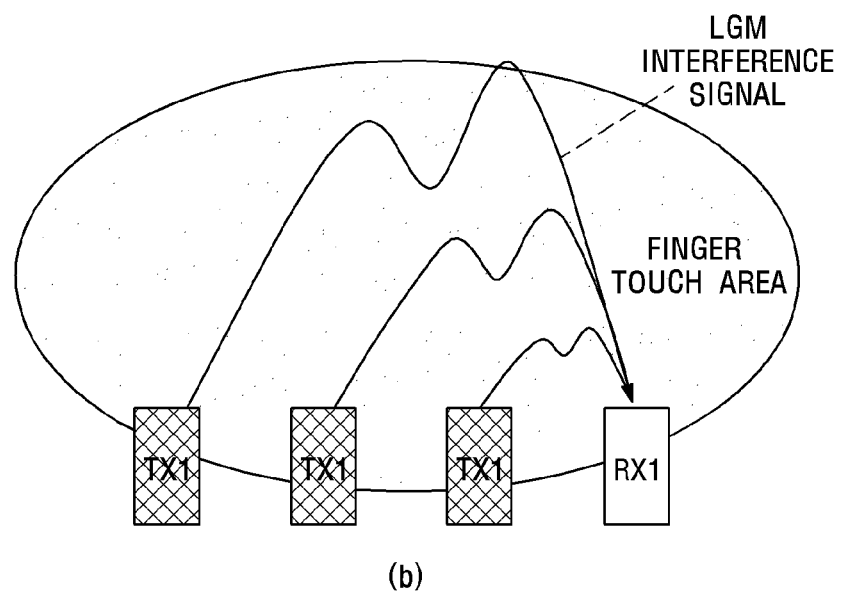
Figure 8C:
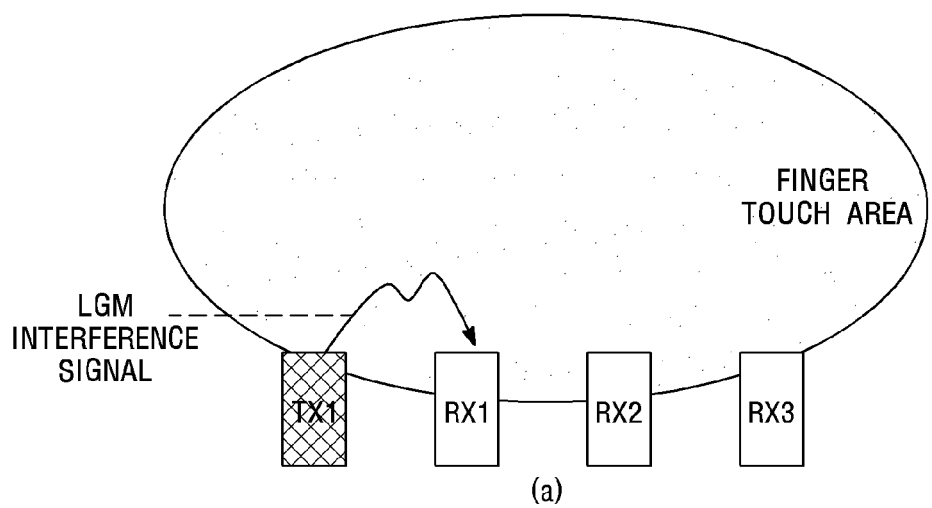
Figure 8C:
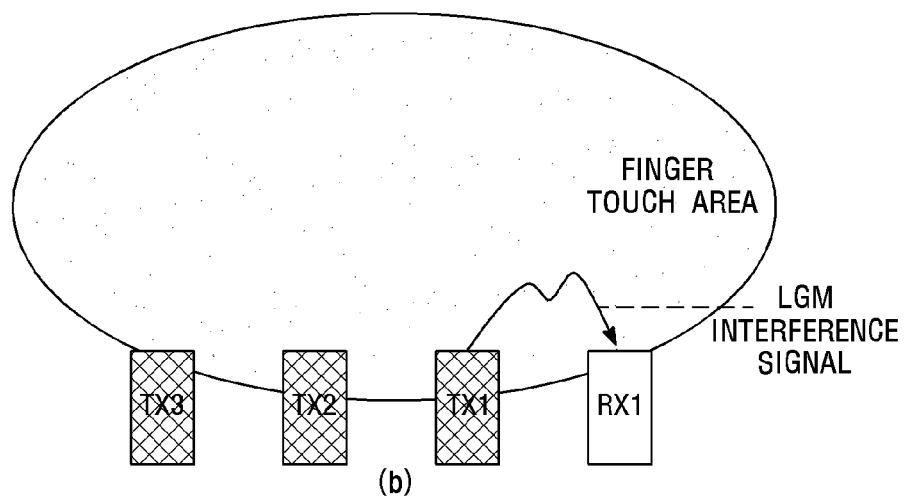

Meanwhile, as described above, according to the electrode arrangement form of the touch sensor panel of FIG. 7A, the plurality of the same receiving electrodes RX1 are arranged in the touch window area S so that the generation amount of the LGM interference signal is relatively increased. That is, when as illustrated in FIG. 8B(a), the number of the same receiving electrodes RX1 arranged in the touch area is large or as illustrated in FIG. 8B(b), the number of the same driving electrodes TX1 arranged in the touch area is large, it can be seen that the LGM interference signal is relatively increased. Accordingly, it is preferable to reduce the number of the same receiving electrodes RX1 arranged in the touch area as illustrated in FIG. 8C(a) and reduce the number of the same driving electrodes TX1 arranged in the touch area as illustrated in FIG. 8C(b).

Therefore, according to the touch sensor panel 1 of FIG. 3A, all of the first electrodes RX0, RX15, RX16, and RX31 included in the touch window area S are separated from each other and connected using different first traces to reduce the aforementioned LGM interference signal, thereby enhancing the touch sensitivity.

Meanwhile, in the present invention, the touch window area S may be defined as an area larger than the touch area of the other fingers, like the touch area of the thumb. Specifically, the area of the touch window area S may be implemented with approximately 15 mm*15 mm or more and approximately 20 mm*20 mm or less, but preferably, the area may be implemented in a size of approximately 16 mm*16 mm In particular, FIGS. 3 to 6 illustrate that the area of the touch window area S is implemented in the size of approximately 16 mm*16 mm.

Specifically, the area of the unit cell (hatched portion in FIG. 3A) may be implemented with approximately 4 mm (length)*2 mm (horizontal). Thus, in the case of FIG. 3, a vertical length of one RX electrode (the size of four unit cells) is approximately 16 mm, and a horizontal length is approximately 2 mm In addition, a vertical length of one TX electrode (the size of one unit cell) is approximately 4 mm, and a horizontal length is approximately 2 mm. Accordingly, FIG. 3A illustrates that the area of the touch window area S is implemented in the size of approximately 16 mm*16 mm. For reference, since the vertical length of TX0 in column B1 is approximately 4 mm, the horizontal length is approximately 1 mm, and the vertical length of TX0 in column B5 is approximately 4 mm and the horizontal length is approximately 1 mm, the combined area of the two electrodes becomes the area of one unit cell.

For example, referring to FIG. 3, the touch window area S may include some RX0, RX3, RX4, and RX7 of the plurality of first electrodes RX0 to RX7 and some TX0, TX3, TX4, and TX7 of the plurality of second electrodes TX0 to TX7. Specifically, the touch window area S may be constituted by four consecutive first electrodes RX0, RX3, RX4, and RX7 in the column direction among the plurality of first electrodes RX0 to RX7 and four consecutive second electrodes TX0 to TX3 or TX4 to TX7 correspondingly adjacent to the four first electrodes RX0, RX3, RX4, and RX7, respectively in the row direction.

For example, a 1-1 electrode RX0 and a 1-2-th electrode RX1 may be arranged in the first electrode array A1. A 2-1-st electrode TX0, a 2-2-nd electrode TX3, a 2-3-rd electrode TX4, and a 2-4-th electrode RX7 may be arranged to be correspondingly adjacent to the 1-1-th electrode RX0 and a 2-1'-th electrode TX7, a 2-2'-nd electrode TX4, a 2-3'-rd electrode TX3, and a 2-4'-th electrode TX0 may be arranged to be correspondingly adjacent to a 1-2-nd electrode RX1, in the second electrode array B2. In addition, the 2-1-st electrode TX0 and the 2-4'-th electrode TX0 may be electrically connected to each other by using a 2-1-th trace, the 2-2-nd electrode TX3 and the 2-2'-nd electrode TX3 may be electrically connected to each other by using a 2-2-nd trace, the 2-3-rd electrode TX4 and the 2-2'-nd electrode TX4 may be electrically connected to each other by using a 2-3-rd trace, and the 2-4-th electrode TX7 and the 2-1'-st electrode TX7 may be electrically connected to each other by using a 2-4-th trace. In addition, the mutual capacitance may be generated between the 1-1-st electrode RX0 and the 2-1-st electrode TX0 and the mutual capacitance may be generated between the 1-2-nd electrode RX1 and the 2-1'-st electrode TX7. Likewise, the mutual capacitance may be generated between the 1-1-st electrode RX0 and the 2-2-nd electrode TX3, between the 1-1-st electrode RX0 and the 2-3 electrode TX4, and between the 1-1-st electrode RX0 and the 2-4-th electrode TX7 and the mutual capacitance may be generated even between the 1-2-nd electrode RX1 and the 2-2'-nd electrode TX4, between the 1-2-nd electrode RX1 and the 2-3'-rd electrode TX3, and between the 1-2-nd electrode RX1 and the 2-4'-th electrode TX0.

However, this is not applied only in a relationship with column B2 located at a right side of column A1, but may be applied in the same/similar manner in a relationship with column B1 located at a left side of column A1. In addition, this is not applied only between column A1 and column B2 and may be applied even to the remaining first electrode array and the remaining second electrode array in the same/similar manner.

Figure 3B:
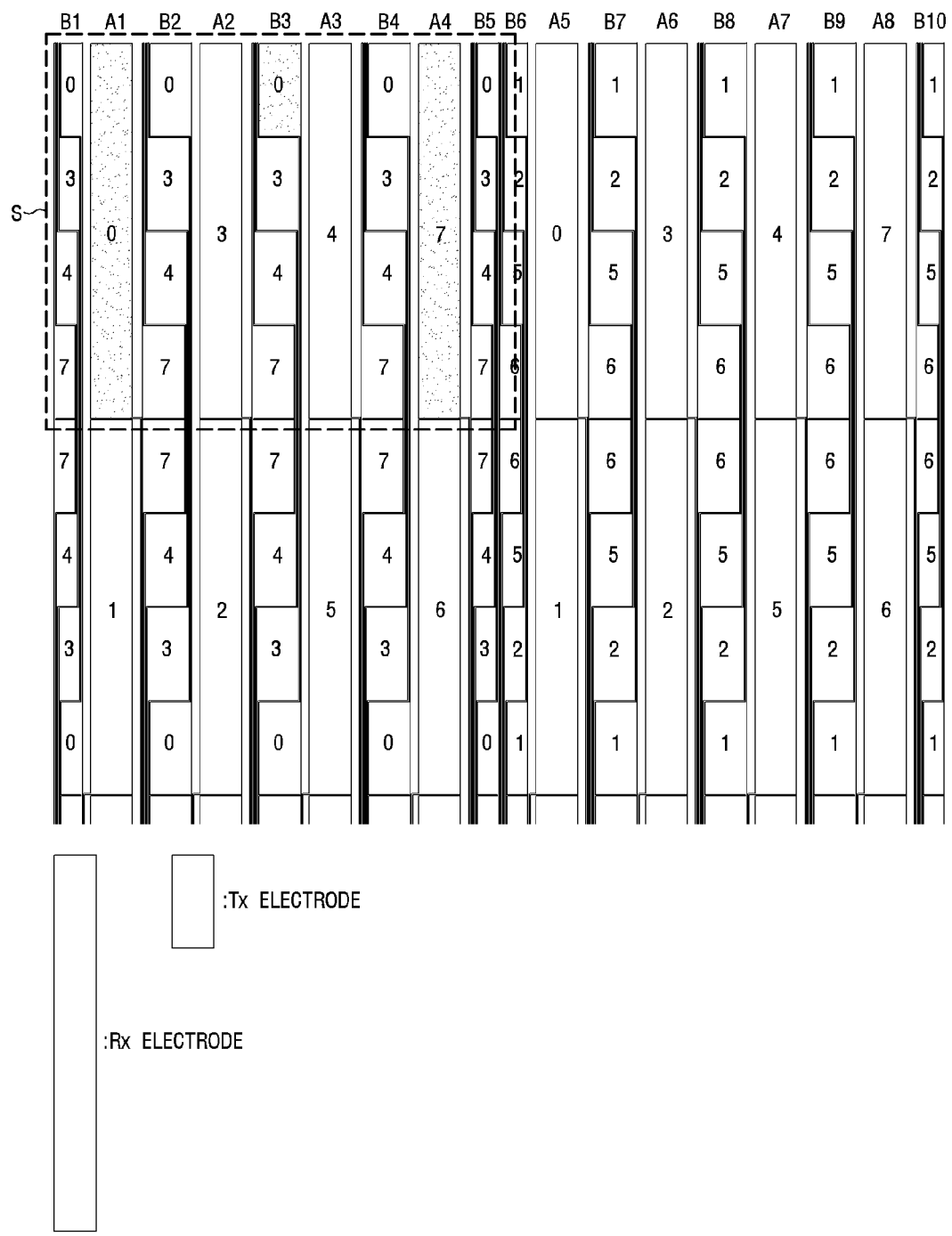

In this case, as illustrated in FIG. 3B, a combination (or pair) of a coordinate of a predetermined first electrode TX0 and a coordinate of a predetermined second electrode RX0 or RX7 spaced apart from the first electrode TX0 by a predetermined distance in the touch window area S may be implemented not to be repeated in the same manner in the remaining touch areas (or other window areas other than the touch window area S) other than the touch window area S. Specifically, a coordinate combination of a predetermined first electrode connected to the predetermined first electrode TX0 by using the first trace and a predetermined second electrode connected to the predetermined second electrode RX0 or RX7 by using the second trace may be implemented not to exist similarly in different window areas. In this case, a pair of the predetermined first electrode TX0 and the predetermined second electrode RX0 or RX7 are arranged spaced apart from each other by a predetermined distance and a pair of the predetermined first electrode and the predetermined second electrode which do not exist in the other window area may be arranged adjacent to each other.

A definition of the touch window area S described above in FIG. 3 may be applied in the same/similar manner throughout the specification.

As a result, as described above, the '−' LGM interference signal is not generated and the touch sensitivity may be enhanced.

In the touch sensor panel 1 of FIG. 3A, the second electrode array B2 may be arranged on one side of any one of the first electrodes RX0 and RX1 included in the first electrode array A1 and the other second electrode array B1 may be arranged on the other side. In addition, any one of the second electrodes TX0, TX3, TX4, and TX7 included in the second electrode array B2 and any one of the second electrodes TX0, TX3, TX4, and TX7 included in the other second electrode array B1 may be arranged in the same row around any one RX0 of the first electrodes RX0 and RX1. In other words, in the same row, the same second electrodes (TX0 or TX3 or TX4 or TX7) connected to the left and right sides of the electrode RX0 through the same channel may be arranged. Here, the second electrodes being connected through the same channel means that the second electrodes are electrically connected to each other. Here, any one of the second electrodes TX0, TX3, TX4, and TX7 included in the second electrode array B2 arranged in the same row and any one of the second electrodes TX0, TX3, TX4, and TX7 included in the other second electrode array B1 mean electrodes connected by using one second trace.

That is, two identical second electrodes having a relatively small size may be arranged adjacent to the left and right sides around the first electrode having a relatively large size. Each of two identical second electrodes may be arranged on the same line.

However, in FIG. 3A, it is illustrated that the same second electrode having the relatively small size is arranged around the first electrode having the relatively large size, but according to another embodiment, the same first electrode having the relatively large size may be implemented to be arranged around the second electrode having the relatively small size.

In addition, although FIG. 3A illustrates that the second electrodes are arranged adjacent to the left and right sides around the first electrode, the second electrodes may be implemented to be arranged adjacent to each other on the upper and lower sides around the first electrode in some embodiments.

In addition, in FIG. 3A it is illustrated that the size of the second electrode (e.g., TX0) of the second electrode array B2 arranged around the first electrode (e.g., RX0) of the first electrode array A1 and the size of the second electrode (e.g., TX0) of the other second electrode array B1 are different, but according to another embodiment, the size of the second electrode (e.g., TX0) of the second electrode array B2 and the size of the second electrode (e.g., TX0) of the other second electrode array B1 may be implemented to be the same.

Meanwhile, in the above-described example, it is exemplified that any one of the second electrodes TX0, TX3, TX4, and TX7 included in the second electrode array B2 arranged in the same row and any one of the second electrodes TX0, TX3, TX4, and TX7 included in the other second electrode array B1 are connected through the same channel, but according to an embodiment, any one of the second electrodes TX0, TX3, TX4, and TX7 included in the second electrode array B2 arranged in the same row and any one of the second electrodes TX0, TX3, TX4, and TX7 included in the other second electrode array B1 may be implemented to be connected through different channels. That is, all of the second electrodes arranged on the same line on the left and right sides of the first electrode may be implemented to be different from each other.

In other words, the second electrodes arranged around the first electrode may be implemented to be all the same or different. When implemented as such, it is possible to improve the effect of splitting the result value of a capacitance signal due to the LGM interference signal compared to implementing some of the second electrodes arranged around the first electrode in the same manner and the remaining second electrodes differently.

Improvement of the result value splitting effect of the capacitance signal will be described below with reference to FIGS. 7E and 7C.

Figure 7E:
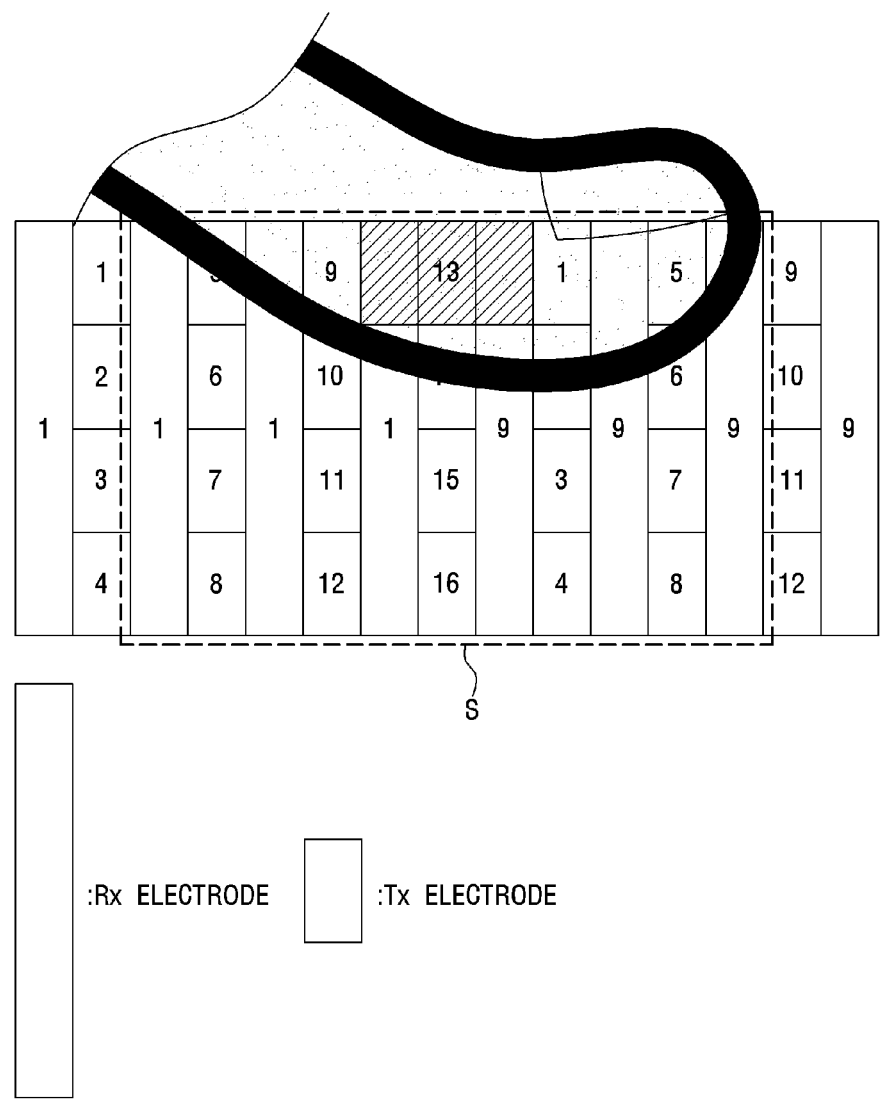

For example, in the case of the electrode arrangement pattern illustrated in FIG. 7E, it can be seen that the TX electrodes arranged adjacent to the same RX electrode on the left and right sides and the TX electrodes arranged adjacent to different RX electrodes on the left and right sides are mixed. For example, it can be seen that the same RX1 electrodes are arranged on the left and right sides in the case of the TX5 electrode and the TX9 electrode arranged on the left side of the TX13 electrode in the touch window area S and the same RX9 electrodes are arranged on the left and right sides in the case of the TX1 electrode and the TX5 electrode arranged on the right side around the TX13 electrode in a dotted line area. On the other hand, it can be seen that in the case of the TX13 electrode located at the center of the touch sensor panel 1, different RX1 electrodes and RX9 electrodes are arranged on the left and right sides. In this case, the effect of splitting the result value of the capacitance signal due to the LGM interference signal is generated on a boundary surface of the TX1 electrode and the TX9 electrode in which the same RX electrodes are arranged on the left and right sides which are hatched regions of FIG. 7E and the TX13 electrode in which different RX electrodes are arranged on the left and right sides.

Specifically, it can be seen that in the case of each of the TX5 electrode and the TX9 electrode arranged on the left side of the TX13 electrode, the number of RX1 electrodes that generate the LGM interference signal is 3 (determined based on the dotted line area) and in the case of each of the TX1 electrode and the TX5 electrode arranged on the right side of the TX13 electrode, the number of RX9 electrodes that generate the LGM interference signal is 3, whereas in the case of the TX13 electrode, the total number of RX electrodes that generate the LGM interference signal is 6 (3 RX1s+3 RX9s). That is, since the magnitude of the LGM disturbance signal suddenly increases at a center point of the touch sensor panel 1 including the TX13 electrode, the magnitude of the final capacitance change ($\Delta$Ctotal) obtained accordingly decreases significantly, and as a result, a graph showing the splitting of the result value of the capacitance signal as illustrated in 7c is derived.

Since the result value splitting effect of the capacitance signal is generated when the TX electrodes arranged adjacent to the same RX electrode on the left and right sides and the TX electrode arranged adjacent to different RX electrodes on the left and right sides are mixed as illustrated in FIG. 7E, when all second electrodes arranged around the first electrode are implemented to be the same or different as illustrated in FIG. 3A, the result value splitting effect of the capacitance signal due to the LGM interference signal may be improved.

Figure 3C:
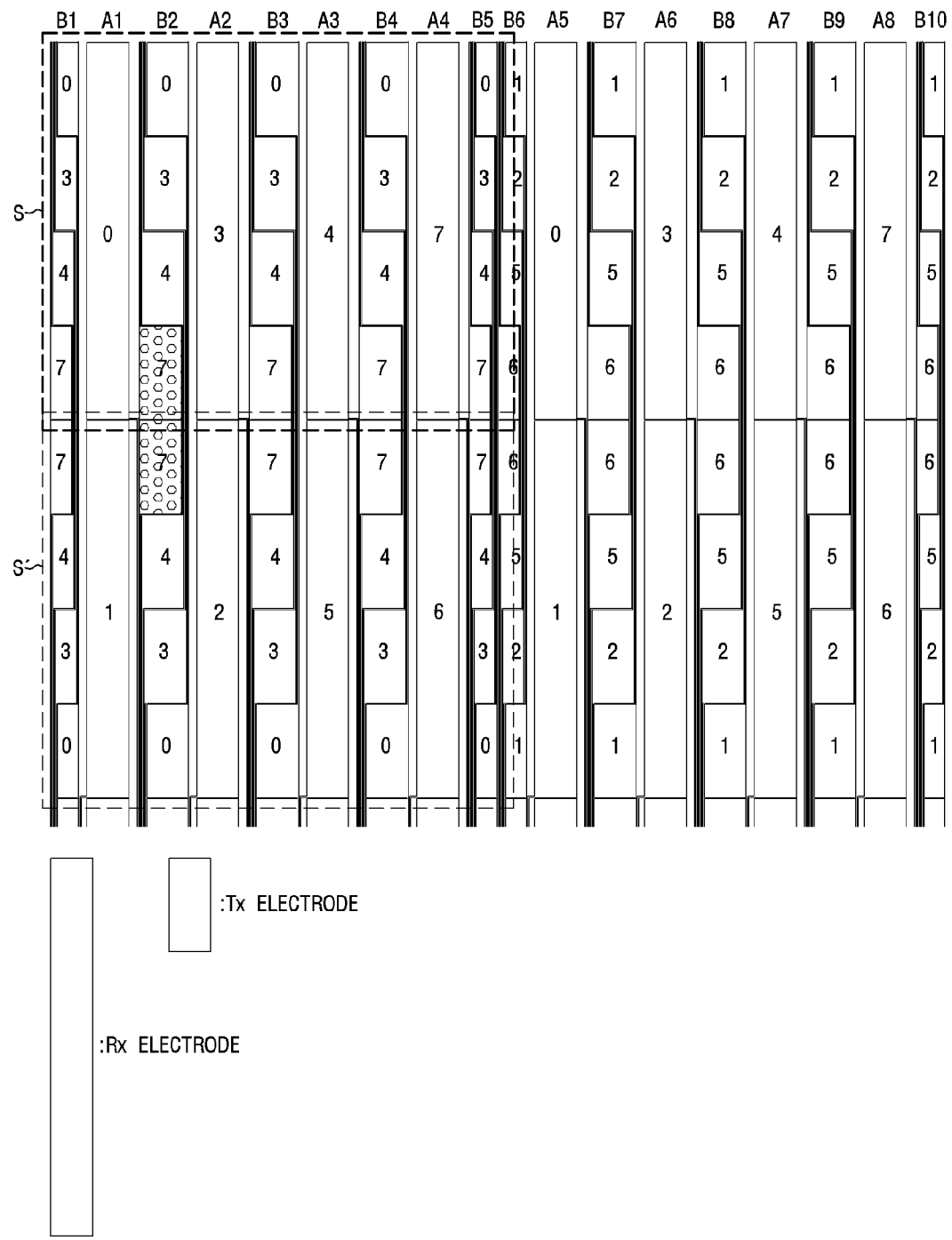

Meanwhile, as illustrated in FIG. 3C, the touch sensor panel 1 may include the touch window area S and an adjacent touch area S' arranged adjacent to the touch window area S in the row direction among the remaining touch areas. In addition, the adjacent touch area S' is defined as an area having the same size as the touch window area S'.

In this case, each of the second electrodes TX0-TX3-TX4-TX7 included in the touch window area S among the second electrodes TX0-TX3-TX4-TX7-TX7-TX4-TX3-TX0 included in the second electrode array B2 may be repeatedly arranged like TX7-TX4-TX3-TX0 in the adjacent touch area S' among the second electrodes TX0-TX3-TX4-TX7-TX7-TX4-TX3-TX0 included in the second electrode array B2. That is, any one of the second electrodes included in the touch window area among the second electrodes included in the second electrode array and a second electrode disposed at a position symmetrical to the any one second electrode of the second electrodes included in the adjacent touch area may be connected by using one second trace. In other words, the same TX electrodes may be arranged in the row direction.

In particular, as illustrated in FIG. 3C, one TX7 (dot pattern) of the second electrodes TX0-TX3-TX4-TX7 included in the touch window area S among the second electrodes TX0-TX3-TX4-TX7-TX7-TX4-TX3-TX0 included in the second electrode array B2 and one TX7 (dot pattern) of the second electrodes TX7-TX4-TX3-TX0 included in the adjacent touch area S' among the second electrodes TX0-TX3-TX4-TX7-TX7-TX4-TX3-TX0 included in the second electrode array B2 may be arranged adjacent to each other and the second electrodes TX7 and TX7 arranged adjacent to each other may be connected by using one second trace. In other words, it is possible to design the electrode arrangement form with a structure in which the TX electrodes are arranged in a first order in the touch window area S and arranged in a reverse order to the first order in the adjacent touch area S'.

However, although not illustrated in the figure, it is possible to design the electrode arrangement form with a structure in which the TX electrodes are arranged in the first order in the touch window area S and arranged in the same order as the first order even in the adjacent touch area S' according to another embodiment.

In this case, one TX7 of the second electrodes TX0-TX3-TX4-TX7 included in the touch window area S among the second electrodes TX0-TX3-TX4-TX7-TX0-TX3-TX4-TX7 included in the second electrode array B2 and one TX0 of the second electrodes TX0-TX3-TX4-TX7 in the adjacent touch area S' among the second electrodes TX0-TX3-TX4-TX7-TX0-TX3-TX4-TX7 included in the second electrode array B2 may be arranged adjacent to each other and the second electrodes TX7 and TX0 arranged adjacent to each other may be connected by using different second traces.

FIG. 4 is a diagram referenced for describing an arrangement form of electrodes in a touch sensor panel 1 according to a second embodiment of the present invention.

Figure 4A:
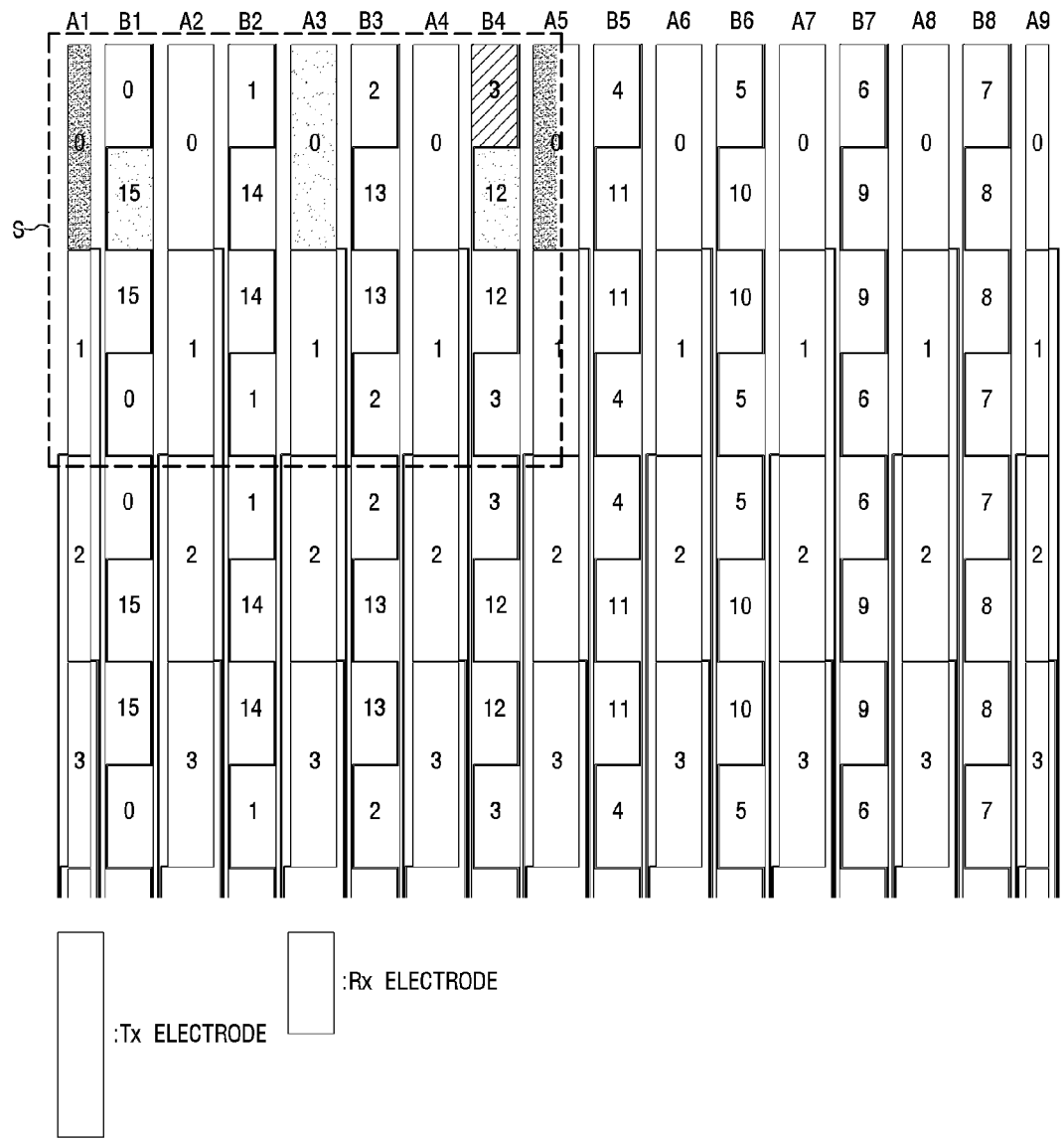
FIG. 4 is a diagram referred for describing an arrangement form of electrodes in a touch sensor panel according to a second embodiment of the present invention.

As illustrated in FIG. 4A, a touch sensor panel 2 according to a second embodiment of the present invention may include a plurality of first electrode arrays A1 to A9 and a plurality of second electrode arrays B1 to B8 extended in a column direction. In addition, as a whole, the first electrode arrays A1 to A9 and the plurality of second electrode arrays B1 to B8 may be arranged to cross each other.

The plurality of first electrode arrays A1 to A9 may include a plurality of first electrodes TX0, TX1, TX2, and TX3, and the plurality of second electrode arrays B1 to B8 may include a plurality of second electrodes RX0 to RX15. In FIG. 4A, it is exemplified that the plurality of first electrodes TX0, TX1, TX2, and TX3 are sequentially arranged with a row direction as a priority, and the plurality of second electrodes RX0 to RX15 are also sequentially arranged with the column direction as the priority, but the scope of the present invention is not limited thereto.

However, FIG. 4A illustrates some of all touch sensor panels 1, and the remaining first electrodes and the remaining second electrodes may be further arranged in the row direction and the column direction. Further, in FIG. 4A, a first electrode having a relatively large size is assumed as the driving electrode, and a second electrode having a relatively small size is assumed as the receiving electrode, but the scope of the present invention is not limited thereto, and even though the first electrode is defined as the receiving electrode and the second electrode is defined as the driving electrode, the electrodes may be applied to the present invention in the same/similar manner.

In FIG. 4A, it illustrated that the electrode and the trace are separated from each other and formed as separate components, but according to an embodiment, the electrode and the trace may be integrated and formed in the form of a metal mesh. In this case, a dead zone in which the touch position such as between the electrode and the trace and/or between the electrode and another electrode is not detected is reduced, so that the sensitivity of detection of the touch position may be further enhanced.

In any one TX0 of the first electrodes TX0, TX1, TX2, and TX3 included in the first electrode array A1 which is any one of the plurality of first electrode arrays A1 to A9, at least two of the second electrodes RX1 and RX14 included in the second electrode array B2 which is any one of the plurality of second electrode arrays B1 to B8 may be arranged to be correspondingly adjacent to each other. However, this is not applied only to the first electrode array A1 and may be applied even to the remaining first electrode arrays A1, and A3 to A8 in the same/similar manner. Further, this is not applied only to the first electrode TX0 and may be applied even to the remaining first electrode TX1 in the same/similar manner.

Any one TX0 of the first electrodes TX0, TX1, TX2, and TX3 included in the first electrode array A2 may be connected to some (e.g., the first electrode TX0 included in the first electrode array A3) of the remaining first electrodes other than any one first electrode (the first electrode TX0 included in the first electrode array A2) of the plurality of first electrodes TX0, TX1, TX2, and TX3 included in the touch sensor panel 1 by using the same channel.

Any one RX1 of the second electrodes RX1 and RX14 included in the second electrode array B2 may be connected to at least some (another second electrode RX1 included in the second electrode array B2) of the remaining second electrodes other than any one second electrode (the second electrode RX1 included in the second electrode array B2) of the plurality of second electrodes RX0 to RX15 included in the touch sensor panel 1 by using one second trace.

Specifically, even if the separate traces are directly connected to each of the same first electrodes (TX0 in column A2 to TX0 in column A3), the separate traces may be combined into one trace again to form one channel, which may be consequently connected to one driving terminal. In addition, the same respective second electrodes (the plurality of RX1s in column B2) are connected by one trace to be thereby connected to one receiving terminal.

According to the structure of the touch sensor panel 1 of FIG. 4A, a plurality of driving electrodes are connected to one driving terminal, and a plurality of receiving electrodes are connected to one receiving terminal, thereby reducing the number of traces.

In particular, at least two second electrodes RX1 and RX14 are arranged adjacent to each other to correspond to the first electrode TX0, and at least two other second electrodes RX14 and RX1 are arranged adjacent to each other to correspond to another first electrode TX1, and then the same electrodes are connected by the second trace, thereby reducing the number of traces as compared with a structure in which a plurality of driving electrodes corresponding to one receiving electrode are connected by different traces as illustrated in FIG. 1D.

Meanwhile, some first electrodes TX0 and TX1 included in the touch window area S among the plurality of first electrodes TX0, TX1, TX2, and TX3 of the touch sensor panel 1 may be connected to different first traces, respectively.

All of the first electrodes TX0 and TX1 included in the touch window area S are separated from each other and connected using different first traces to reduce the aforementioned LGM interference signal, thereby enhancing the touch sensitivity.

Meanwhile, in the present invention, the touch window area S may be defined as an area larger than the touch area of the other fingers, like the touch area of the thumb. Specifically, the area of the touch window area S may be implemented with approximately 15 mm*15 mm or more and approximately 20 mm*20 mm or less, but preferably, the area may be implemented in a size of approximately 16 mm*16 mm In particular, FIGS. 3 to 6 illustrate that the area of the touch window area S is implemented in the size of approximately 16 mm*16 mm.

Specifically, the area of the unit cell (hatched portion in FIG. 4A) may be implemented with approximately 4 mm (length)*2 mm (horizontal). Thus, in the case of FIG. 4, a vertical length of one TX electrode (the size of two unit cells) is approximately 8 mm, and a horizontal length is approximately 2 mm In addition, a vertical length of one RX electrode (the size of one unit cell) is approximately 4 mm, and a horizontal length is approximately 2 mm. Accordingly, FIG. 4A illustrates that the area of the touch window area S is implemented in the size of approximately 16 mm*16 mm. For reference, since the vertical length of TX0 (black part) in column A1 is approximately 8 mm, the horizontal length is approximately 1 mm, and the vertical length of ½ area (black part) of TX0 in column A5 is approximately 8 mm and the horizontal length is approximately 1 mm, the combined area of the two electrodes becomes the area of the two unit cells.

In FIG. 4A, the touch window area S may include some TX0 and TX1 of the plurality of first electrodes TX0, TX1, TX2, and TX3 and some RX0 to RX3 and RX12 to RX15) of the plurality of second electrodes RX0 to RX15. Specifically, the touch window area S may be constituted by four consecutive first electrodes TX0 (for reference, TX0 in column A1 and TX0 in column A5 are combined and counted as one) in the column direction among the plurality of first electrodes TX0, TX1, TX2, and TX3, four consecutive other first electrodes TX1 (for reference, TX1 in column A1 and TX1 in column A5 are combined and counted as one) in the column direction, and two consecutive second electrodes (RX0 and RX15 or RX1 and RX14 or RX2 and RX13 or RX3 and, RX12) in the row direction for each of eight first electrodes TX0 and TX1.

Based on the touch window area S, the 1-1-th electrode TX0 and the 1-2-th electrode TX1 may be arranged in the first electrode array A2. In the second electrode array B2, the 2-1-st electrode RX1 and the 2-2-nd electrode RX14 correspondingly adjacent to the 1-1-st electrode TX0 may be arranged and the 2-1'-st electrode RX14 to the 2-2'-nd electrode RX1 correspondingly adjacent to the 1-2-nd electrode TX1 may be arranged. In addition, the 2-1-st electrode RX1 and the 2-2'-nd electrode RX1 may be electrically connected to each other by the 2-1-st trace and the 2-2-nd electrode RX14 and the 2-1'-st electrode RX14 may be electrically connected to each other using the 2-2-nd trace. In addition, mutual capacitance may be generated between the 1-1-st electrode TX0 and the 2-1-st electrode RX1 and between the 1-1-st electrode TX0 and the 2-2-nd electrode RX14, and the mutual capacitance may be generated even between the 1-2-nd electrode TX1 and the 2-1'-st electrode RX14 and between the 1-2-nd electrode TX1 and the 2-2'-nd electrode RX1.

However, such a feature is not applied only in a relationship with column B2 located at a right side of column A2, but may be applied in the same/similar manner in a relationship with column B1 located at a left side of column A2. In addition, this may be applied even to the remaining first electrode array and the remaining second electrode array in the same/similar manner in addition to column A2 and column B2. In addition, the feature described based on the touch window area S may be applied even to the remaining touch window area in the same/similar manner.

In this case, as illustrated in FIG. 4A, a combination of a coordinate of a predetermined first electrode TX0 and a coordinate of a predetermined second electrode RX12 or RX15 spaced apart from the first electrode TX0 by a predetermined distance in the touch window area S may be implemented not to be repeated in the same manner in the remaining touch areas other than the touch window area S. Specifically, a coordinate combination of a predetermined first electrode connected to the predetermined first electrode TX0 by using the first trace and a predetermined second electrode connected to the predetermined second electrode RX12 or RX15 by using the second trace may be implemented not to exist similarly in different window areas. In this case, a pair of the predetermined first electrode TX0 and the predetermined second electrode RX12 or RX15 are arranged spaced apart from each other by a predetermined distance and a pair of the predetermined first electrode and the predetermined second electrode which do not exist in the other window area may be arranged adjacent to each other.

As a result, as described above, the '−' LGM interference signal is not generated and the touch sensitivity may be enhanced.

In the touch sensor panel 1 of FIG. 4A, a first electrode array A2 may be arranged on one side around any one of the second electrodes RX1 and RX14 included in the second electrode array B2 and another first electrode array A3 may be arranged on the other side, and any one of the first electrodes TX0 to TX3 included in the first electrode array A2 and any one of the first electrodes TX0 to TX3 included the another first electrode array A3 may be arranged in the same row around any one of the second electrodes RX1 and RX14. In other words, in the same row, the first electrodes (TX0 or TX1 or TX2 or TX3) connected to the left and right sides of the electrode RX1 through the same channel may be arranged. Here, the first electrodes being connected through the same channel means that the first electrodes are electrically connected to each other.

That is, two identical first electrodes having a relatively large size may be arranged adjacent to the left and right sides around the second electrode having a relatively small size. Each of two identical first electrodes may be arranged on the same line.

However, in FIG. 4A, it is illustrated that the same first electrode having the relatively large size is arranged around the second electrode having the relatively small size, but according to another embodiment, the same second electrode having the relatively small size may be implemented to be arranged around the first electrode having the relatively large size.

In addition, although FIG. 4A illustrates that the first electrodes are arranged adjacent to the left and right sides around the second electrode, the first electrodes may be implemented to be arranged adjacent to each other on the upper and lower sides around the second electrode in some embodiments.

Meanwhile, in the above-described example, it is exemplified that any one of the first electrodes TX0 to TX3 included in the first electrode array A2 arranged in the same row and any one of the first electrodes TX0 to TX3 included in the other second electrode array A3 are connected by using the same channel, but according to an embodiment, any one of the first electrodes TX0 to TX3 included in the first electrode array A2 arranged in the same row and any one of the first electrodes TX0 to TX3 included in the other second electrode array A3 may be implemented to be connected by using different channels. That is, all of the first electrodes arranged on the same line on the left and right sides of the second electrode may be implemented to be different from each other.

In other words, the first electrodes arranged around the second electrode may be implemented to be all the same or different. When implemented as such, it is possible to improve the effect of splitting the result value of a capacitance signal due to the LGM interference signal compared to implementing some of the first electrodes arranged around the second electrode in the same manner and the remaining second electrodes differently.

Figure 4B:
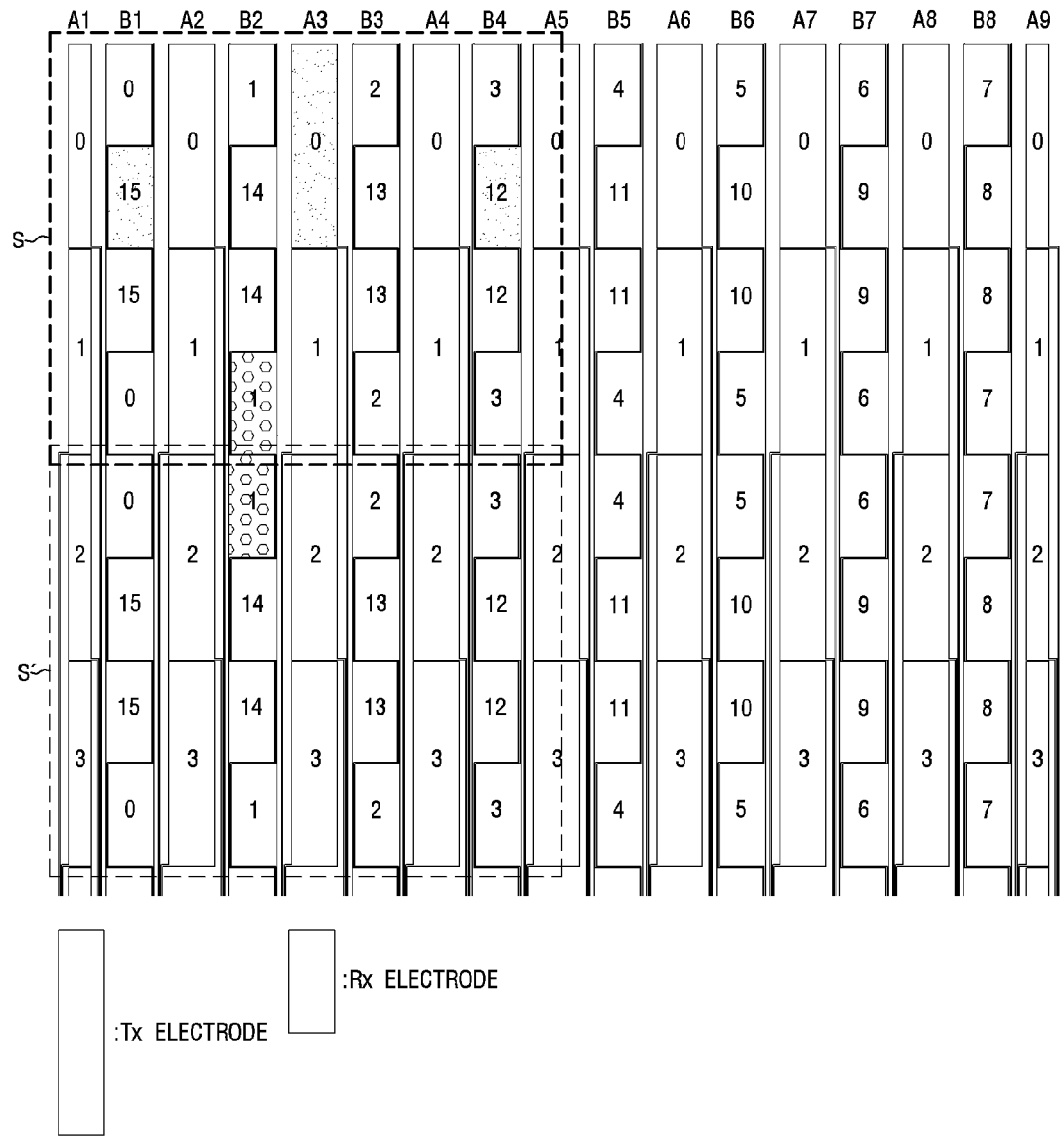

Meanwhile, as illustrated in FIG. 4B, the touch sensor panel 1 may include the touch window area S and an adjacent touch area S' arranged adjacent to the touch window area S in the row direction among the remaining touch areas. In addition, the adjacent touch area S' is defined as an area having the same size as the touch window area S'.

In this case, each of the second electrodes RX1-RX14-RX14-RX1 included in the touch window area S among the second electrodes RX1-RX14-RX14-RX1-RX1-RX14-RX14-RX1 included in the second electrode array B2 may be repeatedly arranged like RX1-RX14-RX14-RX1 in the adjacent touch area S' among the second electrodes RX1-RX14-RX14-RX1-RX1-RX14-RX14-RX1 included in the second electrode array B2. That is, any one of the second electrodes included in the touch window area among the second electrodes included in the second electrode array and a second electrode disposed at a position symmetrical to any one second electrode of the second electrodes included in the adjacent touch area may be connected by using one second trace. In addition, within one touch window area, the RX1 electrode in column B2 adjacent to the TX0 electrode in column A2 may be connected to RX1 in column B2 adjacent to the TX1 electrode in column A2 by using a second trace and here, the RX1 electrode in column B2 adjacent to the TX1 electrode in column A2 may be arranged at a position symmetrical to the RX1 electrode in column B2 adjacent to the TX0 electrode in column A2.

In other words, the same RX electrodes may be arranged in the row direction.

In particular, as illustrated in FIG. 4B, one RX1 (dot pattern) of the second electrodes RX1-RX14-RX14-RX1 included in the touch window area S among the second electrodes RX1-RX14-RX14-RX1-RX1-RX14-RX14-RX1 included in the second electrode array B2 and one RX1 (dot pattern) of the second electrodes RX1-RX14-RX14-RX1 included in the adjacent touch area S' among the second electrodes RX1-RX14-RX14-RX1-RX1-RX14-RX14-RX1 included in the second electrode array B2 may be arranged adjacent to each other and the second electrodes RX1 arranged adjacent to each other may be connected by using one second trace.

Figure 5:
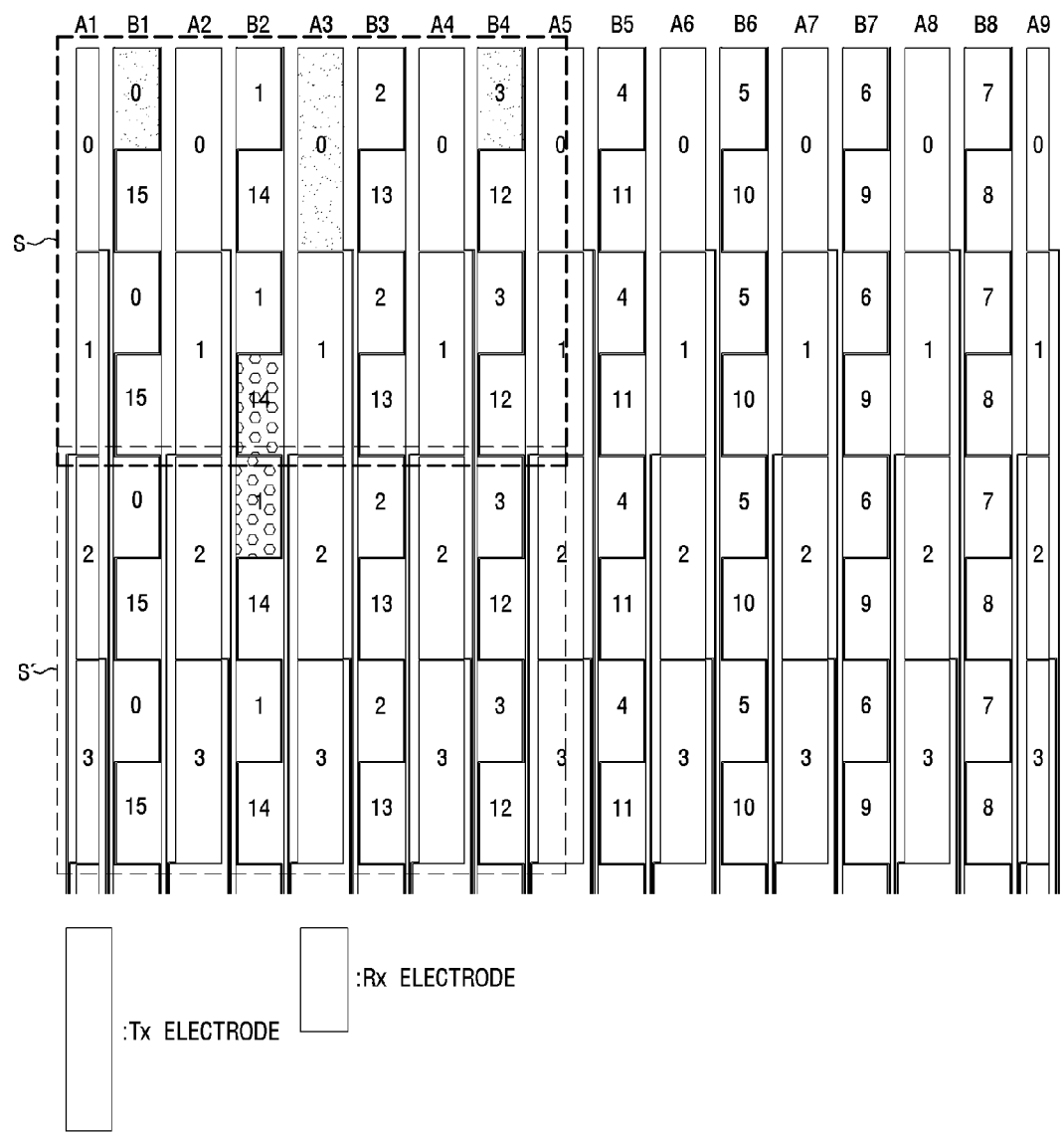
FIG. 5 is a diagram referred for describing an arrangement form of electrodes in a touch sensor panel according to a third embodiment of the present invention.

FIG. 5 illustrates an electrode arrangement form of a touch sensor panel 1 according to a third embodiment of the present invention.

In FIG. 5, all configurations may be implemented in the same manner as the touch sensor panel 1 according to the second embodiments except for the following configuration. That is, all contents described in the touch sensor panel 1 according to the second embodiments may be applied to the touch sensor panel 1 according to the third embodiment in the same/similar manner except for the following configuration.

Here, in the case of FIG. 5, the following configuration means that one RX14 (dot pattern) of the second electrodes RX1-RX14-RX1-RX14 included in the touch window area S among the second electrodes RX1-RX14-RX1-RX14-RX1-RX14-RX1-RX14 included in the second electrode array B2 and one RX1 (dot pattern) of the second electrodes RX1-RX14-RX1-RX14 included in the adjacent touch area S' among the second electrodes RX1-RX14-RX1-RX14-RX1-RX14-RX1-RX14 included in the second electrode array B2 may be arranged adjacent to each other and the second electrodes RX14 and RX1 arranged adjacent to each other may be connected by using different second traces. That is, any one of the second electrodes included in the touch window area among the second electrodes included in the second electrode array and a second electrode disposed at a position corresponding to any one second electrode of the second electrodes included in the adjacent touch area may be connected by using one second trace.

Figure 6:
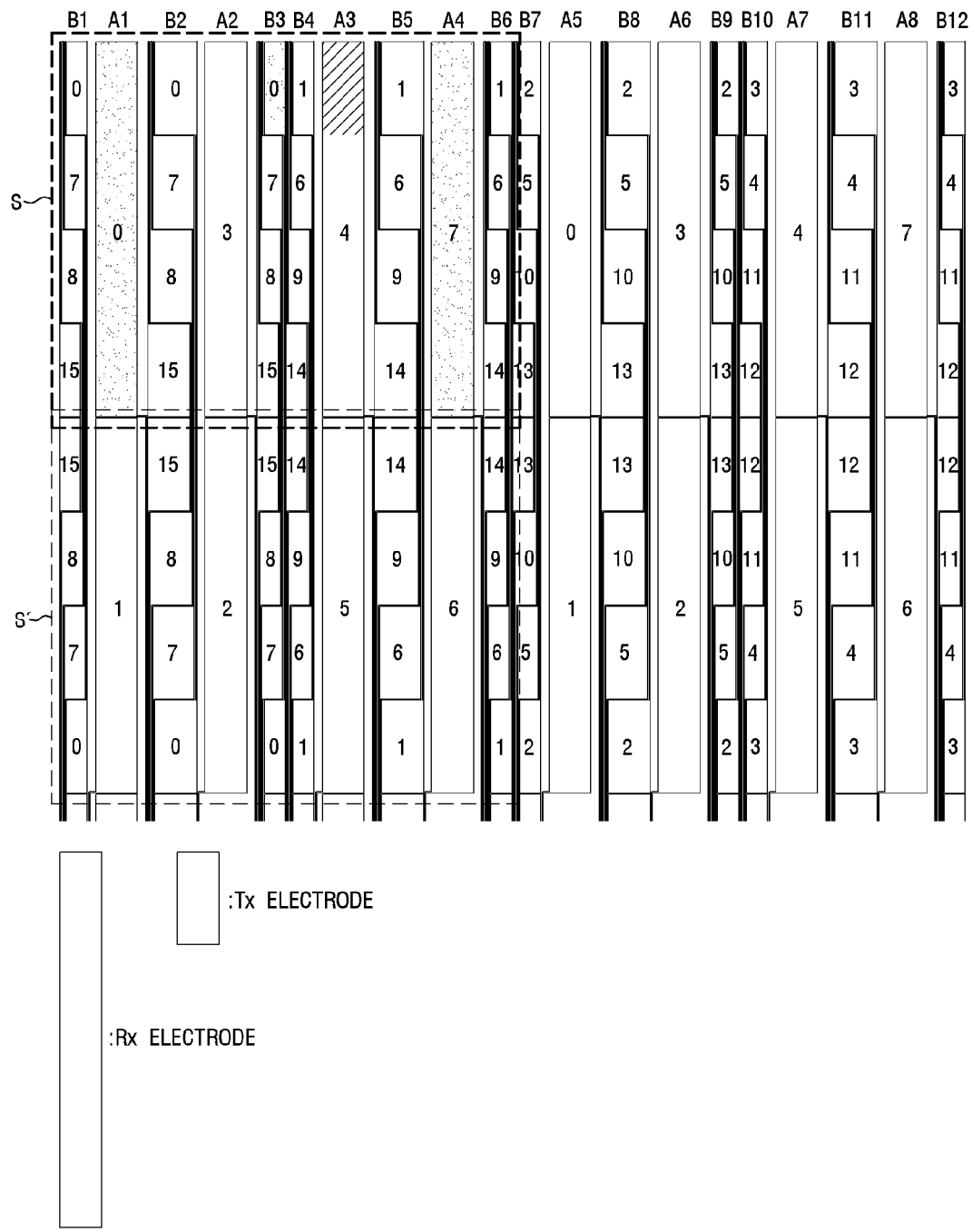
FIG. 6 is a diagram referred for describing an arrangement form of electrodes in a touch sensor panel according to a fourth embodiment of the present invention.

FIG. 6 is a diagram referred to for describing a touch sensor panel 1 according to a fourth embodiment of the present invention.

As illustrated in FIG. 6, a touch sensor panel 1 according to a fourth embodiment of the present invention may include a plurality of first electrode arrays A1 to A8 and a plurality of second electrode arrays B1 to B12 extended in a column direction. In addition, as a whole, the first electrode arrays A1 to A8 and the plurality of second electrode arrays B1 to B12 may be arranged to cross each other. However, some second electrode arrays B3 and B4, B6 and B7, or B9 and B10 may be consecutively arranged between the plurality of first electrode arrays A1 to A8.

The plurality of first electrode arrays A1 to A8 may include a plurality of first electrodes RX0 to RX7, and the plurality of second electrode arrays B1 to B12 may include a plurality of second electrodes TX0 to TX15. In FIG. 6, it is exemplified that the plurality of first electrodes RX0 to RX7 are sequentially arranged in the row direction as the priority and the plurality of second electrodes TX0 to TX15 are sequentially arranged in the column direction as the priority, but the scope of the present invention is not limited thereto.

However, FIG. 6 illustrates some of all touch sensor panels 1, and the remaining first electrodes and the remaining second electrodes may be further arranged in the row direction and the column direction. Further, in FIG. 6, a first electrode having a relatively large size is assumed as the receiving electrode, and a second electrode having a relatively small size is assumed as the driving electrode, but the scope of the present invention is not limited thereto, and even though the first electrode is defined as the driving electrode and the second electrode is defined as the receiving electrode, the electrodes may be applied to the present invention in the same/similar manner.

In FIG. 6, it illustrated that the electrode and the trace are separated from each other and formed as separate components, but according to an embodiment, the electrode and the trace may be integrated and formed in the form of a metal mesh. In this case, a dead zone in which the touch position such as between the electrode and the trace and/or between the electrode and another electrode is not detected is reduced, so that the sensitivity of detection of the touch position may be further enhanced.

In any one RX0 of the first electrodes RX0 and RX1 included in the first electrode array A1 which is any one of the plurality of first electrode arrays A1 to A8, at least two of the second electrodes TX0, TX7, TX8, and TX15 included in the second electrode array B2 which is any one of the plurality of second electrode arrays B1 to B12 may be arranged to be correspondingly adjacent to each other. However, this is not applied only to the first electrode array A1 and may be applied even to the remaining first electrode arrays A2 to A8 in the same/similar manner. Further, this is not applied only to the first electrode RX0 and may be applied even to the remaining first electrode RX1 in the same/similar manner.

Any one RX0 of the first electrodes RX0 and RX1 included in the first electrode array A1 may be connected to some (the first electrode RX0 included in the first electrode array A5) of the remaining first electrodes other than any one first electrode (the first electrode RX0 included in the first electrode array A1) of the plurality of first electrodes RX0 to RX7 included in the touch sensor panel 1 through the same channel That is, this means that the electrode RX0 is connected to the same sensing terminal.

Any one TX0 of the second electrodes TX0, TX7, TX8, and TX15 included in the second electrode array B2 may be connected to at least some (the second electrode TX0 included in the second electrode arrays B1 to B3) of the remaining second electrodes other than any one second electrode (the second electrode TX0 included in the second electrode array B2) of the plurality of second electrodes TX0 to TX3, TX4 to TX11, or TX12 to TX15 included in the touch sensor panel 1 through the same channel. That is, this means that the electrode TX0 is connected to the same driving terminal.

For example, even if separate traces are directly connected to each of the same first electrodes (RX0 in column A1 and RX0 in column A5), the separate traces may be combined into one trace again and consequently connected to one receiving terminal. In addition, even if the separate traces are directly connected to each of the same second electrodes (TX0 in column B1, TX0 in column B2, and TX0 in column B3), the separate traces may be combined into one trace again and consequently connected to one driving terminal.

According to the structure of the touch sensor panel 1 of FIG. 6, a plurality of driving electrodes are connected to one driving terminal, and a plurality of receiving electrodes are connected to one receiving terminal, thereby reducing the number of traces.

In particular, at least two of the second electrodes TX0, TX7, TX8, and TX15 are arranged adjacent to the first electrode RX0 and at least two of other second electrodes TX15, TX8, TX7, and TX0 are arranged to be correspondingly adjacent to the other first electrode RX1, and then electrodes of the same number among the second electrodes TX0, TX7, TX8, and TX15 and other second electrodes TX15, TX8, TX7, and TX0 are connected by using one second trace, and as a result, the number of traces may be reduced compared to a structure in which a plurality of driving electrodes corresponding to one receiving electrode are connected by different traces as illustrated in FIG. 1D.

Meanwhile, some first electrodes RX0, RX3, RX4, and RX7 included in the touch window area S among the plurality of first electrodes RX0 to RX7 of the touch sensor panel 1 may be connected to different first traces, respectively.

All of the first electrodes RX0, RX3, RX4, and RX7 included in the touch window area S are separated from each other and connected using different first traces to reduce the aforementioned LGM interference signal, thereby enhancing the touch sensitivity.

For reference, the principle of generating the LGM interference signal is as described above with reference to FIGS. 7 and 8.

Meanwhile, in the present invention, the touch window area S may be defined as an area larger than the touch area of the other fingers, like the touch area of the thumb. Specifically, the area of the touch window area S may be implemented with approximately 15 mm*15 mm or more and approximately 20 mm*20 mm or less, but preferably, the area may be implemented in a size of approximately 16 mm*16 mm In particular, FIGS. 3 to 6 illustrate that the area of the touch window area S is implemented in the size of approximately 16 mm*16 mm.

Specifically, the area of the unit cell (hatched portion in FIG. 6) may be implemented with approximately 4 mm (long)*2 mm (horizontal). Thus, in the case of FIG. 4, a vertical length of one RX electrode (the size of four unit cells) is approximately 16 mm, and a horizontal length is approximately 2 mm In addition, a vertical length of one TX electrode (the size of one unit cell) is approximately 4 mm, and a horizontal length is approximately 2 mm In particular, FIG. 6 illustrates that the area of the touch window area S is implemented in the size of approximately 16 mm*16 mm. For reference, since the vertical length of TX0 in column B1 is approximately 4 mm, the horizontal length is approximately 1 mm, and the vertical length of TX1 in column B6 is approximately 4 mm and the horizontal length is approximately 1 mm, the combined area of the two electrodes becomes the area of one unit cell.

In the case of FIG. 6, the touch window area S may include some RX0, RX3, RX4, and RX7 of the plurality of first electrodes RX0 to RX7 and some TX0, TX1, TX6, TX7, TX8, TX9, TX14, and TX15 of the plurality of second electrodes TX0 to TX3, TX4 to TX11, or TX12 to TX15. Specifically, the touch window area S may be constituted by four consecutive first electrodes RX0, RX3, RX4, and RX7 in the column direction among the plurality of first electrodes RX0 to RX7 and four consecutive second electrodes TX0, TX7, TX8, and TX15 or TX1, TX6, TX9, and TX14 in the row direction for the four first electrodes RX0, RX3, RX4, and RX7, respectively.

For example, a 1-1 electrode RX0 and a 1-2-th electrode RX1 may be arranged in the first electrode array A1. A 2-1-st electrode TX0, a 2-2-nd electrode TX7, a 2-3-rd electrode TX8, and a 2-4-th electrode TX15 correspondingly adjacent to a 1-1-st electrode RX0 and a 2-1'-st electrode TX15, a 2-2'-nd electrode TX8, a 2-3'-rd electrode TX7, and a 2-4'-th electrode TX0 correspondingly adjacent to the 1-2-nd electrode RX1 may be arranged in the second electrode array B2. In addition, the 2-1 electrode TX0 and the 2-4'-th electrode TX0 may be electrically connected to each other by using a 2-1-st trace, the 2-2-nd electrode TX7 and the 2-3'-rd electrode TX7 may be electrically connected to each other by using a 2-2-nd trace, the 2-3-rd electrode TX8 and the 2-2'-nd electrode TX8 may be electrically connected to each other by using a 2-3-rd trace, and the 2-4-th electrode TX15 and the 2-1'-st electrode TX15 may be electrically connected to each other by using a 2-4-th trace. In addition, the mutual capacitance may be generated between the 1-1-st electrode RX0 and the 2-1-st electrode TX0 and the mutual capacitance may be generated between the 1-2-nd electrode RX1 and the 2-1'-st electrode TX15. Likewise, the mutual capacitance may be generated between the 1-1-st electrode RX0 and the 2-2-nd electrode TX7, between the 1-1-st electrode RX0 and the 2-3-rd electrode TX8, and between the 1-1-st electrode RX0 and the 2-4-th electrode TX15 and the mutual capacitance may be generated even between the 1-2-nd electrode RX1 and the 2-2'-nd electrode TX8, between the 1-2-nd electrode RX1 and the 2-3'-rd electrode TX7, and between the 1-2-nd electrode RX1 and the 2-4'-th electrode TX0.

However, this is not applied only between column A1 and column B2 arranged on the right side of column A1, and may be applied even between column A1 and column B1 arranged on the left side of column A1 in the same/similar manner In addition, this is not applied only between column A1 and column B2 and may be applied even to the remaining first electrode array and the remaining second electrode array in the same/similar manner other than column A1 and column B2.

In this case, as illustrated in FIG. 6, a combination (or pair) of a coordinate of a predetermined first electrode TX0 and a coordinate of a predetermined second electrode RX0 or RX7 spaced apart from the first electrode TX0 by a predetermined distance in the touch window area S may be implemented not to be repeated in the same manner in the remaining touch areas other than the touch window area S. Specifically, a coordinate combination of a predetermined first electrode connected to the predetermined first electrode TX0 by using the first trace and a predetermined second electrode connected to the predetermined second electrode RX0 or RX7 by using the second trace may be implemented not to exist similarly in different window areas. In this case, a pair of the predetermined first electrode TX0 and the predetermined second electrode RX0 or RX7 are arranged spaced apart from each other by a predetermined distance and a pair of the predetermined first electrode and the predetermined second electrode which do not exist in the other window area may be arranged adjacent to each other.

As a result, as described above, the '−' LGM interference signal is not generated and the touch sensitivity may be enhanced.

In the touch sensor panel 1 of FIG. 6, the second electrode array B2 may be arranged on one side of any one of the first electrodes RX0 and RX1 included in the first electrode array A1 and the other second electrode array B1 may be arranged on the other side. In addition, any one of the second electrodes TX0, TX7, TX8, and TX15 included in the second electrode array B2 and any one of the second electrodes TX0, TX7, TX8, and TX15 included in the other second electrode array B1 may be arranged in the same row around any one RX0 of the first electrodes RX0 and RX1. Here, any one of the second electrodes TX0, TX7, TX8, and TX15 included in the second electrode array B2 arranged in the same row and any one of the second electrodes TX0, TX7, TX8, and TX15 included in the other second electrode array B1 mean electrodes connected through the same channel.

That is, two identical second electrodes having a relatively small size may be arranged adjacent to the left and right sides around the first electrode having a relatively large size. Each of two identical second electrodes may be arranged on the same line.

However, in FIG. 6, it is illustrated that the same second electrode having the relatively small size is arranged around the first electrode having the relatively large size, but according to another embodiment, the same first electrode having the relatively large size may be implemented to be arranged around the second electrode having the relatively small size.

In addition, although FIG. 6 illustrates that the second electrodes are arranged adjacent to the left and right sides around the first electrode, the second electrodes may be implemented to be arranged adjacent to each other on the upper and lower sides around the first electrode in some embodiments.

In addition, in FIG. 6, it is illustrated that the size of the second electrode (e.g., TX0) of the second electrode array B2 arranged around the first electrode (e.g., RX0) of the first electrode array A1 and the size of the second electrode (e.g., TX0) of the other second electrode array B1 are different, but according to another embodiment, the size of the second electrode (e.g., TX0) of the second electrode array B2 and the size of the second electrode (e.g., TX0) of the other second electrode array B1 may be implemented to be the same.

Meanwhile, in the above-described example, it is exemplified that any one of the second electrodes TX0, TX7, TX8, and TX15 included in the second electrode array B2 arranged in the same row and any one of the second electrodes TX0, TX7, TX8, and TX15 included in the other second electrode array B1 are connected through the same channel, but according to an embodiment, any one of the second electrodes TX0, TX7, TX8, and TX15 included in the second electrode array B2 arranged in the same row and any one of the second electrodes TX0, TX7, TX8, and TX15 included in the other second electrode array B1 may be implemented to be connected through different channels. That is, all of the second electrodes arranged on the same line on the left and right sides of the first electrode may be implemented to be different from each other.

In other words, the second electrodes arranged around the first electrode may be implemented to be all the same or different. When implemented as such, it is possible to improve the effect of splitting the result value of a capacitance signal due to the LGM interference signal compared to implementing some of the second electrodes arranged around the first electrode in the same manner and the remaining second electrodes differently.

The principle of improvement of the result value splitting effect of the capacitance signal is described above with reference to FIGS. 7E and 7C.

Meanwhile, as illustrated in FIG. 6, the touch sensor panel 1 may include the touch window area S and an adjacent touch area S' arranged adjacent to the touch window area S in the row direction among the remaining touch areas. In addition, the adjacent touch area S' is defined as an area having the same size as the touch window area S'.

In this case, each of the second electrodes TX0-TX7-TX8-TX15 included in the touch window area S among the second electrodes TX0-TX7-TX8-TX15-TX15-TX8-TX7-TX0 included in the second electrode array B2 may be repeatedly arranged like TX15-TX8-TX7-TX0 in the adjacent touch area S' among the second electrodes TX0-TX7-TX8-TX15-TX15-TX8-TX7-TX0 included in the second electrode array B2.

In other words, the same TX electrodes may be arranged in the row direction.

In particular, as illustrated in FIG. 6, one TX15 of the second electrodes TX0-TX7-TX8-TX15 included in the touch window area S among the second electrodes TX0-TX7-TX8-TX15-TX15-TX8-TX7-TX0 included in the second electrode array B2 and one TX15 of the second electrodes TX15-TX8-TX7-TX0 in the adjacent touch area S' among the second electrodes TX0-TX7-TX8-TX15-TX15-TX8-TX7-TX0 included in the second electrode array B2 may be arranged adjacent to each other and the second electrodes TX15 and TX15 arranged adjacent to each other may be connected by using one second trace. In other words, it is possible to design the electrode arrangement form with a structure in which the TX electrodes are arranged in a first order in the touch window area S and arranged in a reverse order to the first order in the adjacent touch area S'.

However, although not illustrated in the figure, it is possible to design the electrode arrangement form with a structure in which the TX electrodes are arranged in the first order in the touch window area S and arranged in the same order as the first order even in the adjacent touch area S' according to another embodiment.

In this case, one TX15 of the second electrodes TX0-TX7-TX8-TX15 included in the touch window area S among the second electrodes TX0-TX7-TX8-TX15-TX0-TX7-TX8-TX15 included in the second electrode array B2 and one TX0 of the second electrodes TX0-TX7-TX8-TX15 in the adjacent touch area S' among the second electrodes TX0-TX7-TX8-TX15-TX0-TX7-TX8-TX15 included in the second electrode array B2 may be arranged adjacent to each other and the second electrodes TX15 and TX0 arranged adjacent to each other may be connected by using different second traces.

Meanwhile, as compared with the arrangement form of the touch sensor panel described above in FIG. 3A, the LGM interference signal is further reduced in the case of FIG. 6. Even in the case of FIGS. 3 to 5, it has been described that the LGM interference signal is reduced compared to the prior art with reference to FIGS. 7 and 8 as an example, but in this case, the LGM interference signal reduction effect due to the fact that all the first electrodes included in the touch window area S are separated is described, and in FIG. 6, in addition to the effect, the principle in which a separate LGM interference signal reduction effect occurs will be additionally described below.

As described above, FIG. 7D illustrates a situation in which as a touch area of the thumb increases gradually, the number of the same receiving electrodes RX1 included in the corresponding touch area gradually increases as described above (1 in state 1→3 in state 2→4 in state 3). In addition, as described above, it is preferable to reduce the number of the same receiving electrodes RX1 arranged in the touch area as illustrated in FIG. 8C(a) and reduce the number of the same driving electrodes TX1 arranged in the touch area S by an object as illustrated in FIG. 8C(b) in the corresponding touch area.

In addition, FIG. 6 illustrates that as a result value of multiplying the number of unit cells constituting the same driving electrode TX disposed in the touch area S by the object and the number of unit cells constituting the same receiving electrode RX becomes further minimized, the effect of the LGM interference signal decreases.

For example, in the case of FIG. 3A, it can be seen that the number of unit cells (hatched) constituting the same receiving electrode RX4 in the touch window area S by the object is 4, and the number of unit cells constituting the same driving electrode TX0 is 4, and a product thereof is 4*4=16. For reference, here, the unit cell is defined as a region of the same size as the TX electrode having a relatively smaller size than the RX electrode.

On the other hand, in the case of FIG. 6, it can be seen that the number of unit cells (hatched) constituting the same receiving electrode RX4 in the touch area S by the object is 4, and the number of unit cells constituting the same driving electrode TX0 is 2, and a product thereof is 4*2=8. For reference, here, the unit cell is defined as a region of the same size as the TX electrode having a relatively smaller size than the RX electrode. In the case of FIG. 6, since the number of unit cells is reduced by ½ compared to FIG. 3A, the magnitude of the LGM interference signal is also reduced by ½.

As a result, FIG. 6 illustrates that the number of the same driving electrodes and/or the same receiving electrodes included in the touch area S by the object is reduced, and a result value acquired by multiplying the number of unit cells constituting the same driving electrode TX arranged in the touch window area S by the object and the number of unit cells constituting the same receiving electrode RX is minimized to less than 16 (a predetermined value), and as a result, the effect of the LGM interference signal is reduced.

However, the predetermined value (16) is only an embodiment of the present invention, and the scope of the present invention is not limited thereto, and the predetermined value may be defined as various numerical values.

Hereinabove, features, structures, effects, and the like described in the embodiments are included in one embodiment of the present invention, and are not particularly limited to only one embodiment. Further, features, structures, effects, and the like exemplified in each embodiment may be carried out while being combined or modified for other embodiments by those skilled in the art to which the embodiments pertain. Therefore, the contents related to such combinations and modifications should be interpreted as being included in the scope of the present invention.

Further, although embodiments of the present invention have been mainly described above, these are merely examples and do not limit the present invention, and those skilled in the art to which the present invention pertains will know that various modifications and applications not illustrated above can be made within the scope without departing from the essential characteristics of the embodiment. For example, each component specifically shown in the embodiment may be implemented by being modified. In addition, it will be interpreted that differences related to the modifications and applications are included in the scope of the present invention defined in the appended claims.

INDUSTRIAL APPLICABILITY

It is possible to enhance touch sensitivity without generating a negative final capacitance change amount.

By reducing the number of traces, a touch sensor panel can be manufactured to be slimmer, and manufacturing cost can be reduced.

The invention claimed is:

1. A touch sensor panel comprising:
a plurality of first electrodes and a plurality of second electrodes,
wherein a touch window area includes a first number of consecutive first electrodes in a first direction among the plurality of first electrodes and a second number of consecutive second electrodes in a second direction with respect to the first number of first electrodes, respectively, and
a pair of a predetermined first electrode among the first electrodes included in the touch window area and a predetermined second electrode among the second electrodes do not exist in other window areas other than the touch window area.

2. The touch sensor panel of claim 1, wherein the predetermined first electrode and the predetermined second electrode are arranged to be spaced apart by a predetermined distance.

3. The touch sensor panel of claim 1, wherein the touch sensor panel includes a plurality of first electrode arrays including the plurality of first electrodes and a plurality of second electrode arrays including the plurality of second electrodes and arranged alternatively with the plurality of first electrode arrays,
at least two of the second electrodes included in the second electrode array which is any one of the plurality of second electrode arrays are arranged to be correspondingly adjacent to any one of the first electrodes included in the first electrode array which is any one of the plurality of first electrode arrays, and any one of the second electrodes included in the second electrode array is connected to some of the remaining second electrodes other than the any one second electrode among the second electrodes by using one second trace.

4. The touch sensor panel of claim 3, wherein the first electrodes included in the touch window area among the plurality of first electrodes are connected to different first traces, respectively.

5. The touch sensor panel of claim 3, wherein second electrodes arranged adjacent to a left side and a right side in the same row around any one of the first electrodes included in the first electrode array are connected by using one second trace.

6. The touch sensor panel of claim 3, wherein second electrodes arranged adjacent to the left side and the right side in the same row around any one of the first electrodes included in the first electrode array are connected by using different second traces, respectively.

7. The touch sensor panel of claim 5, wherein the other window area includes an adjacent touch area adjacent to the touch window area in a column direction, and
any one second electrode of the second electrodes included in the touch window area among the second electrodes included in the second electrode array is connected to a second electrode arranged at a location symmetrical to the any one second electrode among the second electrodes included in the adjacent touch area by one second trace.

8. The touch sensor panel of claim 3, wherein first electrodes arranged adjacent to the left side and the right side in the same row around any one of the second electrodes included in the second electrode array are connected by using one first trace.

9. The touch sensor panel of claim 3, wherein first electrodes arranged adjacent to the left side and the right side in the same row around any one of the second electrodes included in the second electrode array are connected by using different first traces, respectively.

10. The touch sensor panel of claim 8, wherein the other window area includes an adjacent touch area adjacent to the touch window area in a column direction, and
any one second electrode of the second electrodes included in the touch window area among the second electrodes included in the second electrode array is connected to a second electrode arranged at a location symmetrical to the any one second electrode among the second electrodes included in the adjacent touch area by one second trace.

11. The touch sensor panel of claim 8, wherein the other window area includes an adjacent touch area adjacent to the touch window area in a column direction, and
any one second electrode of the second electrodes included in the touch window area among the second electrodes included in the second electrode array is connected to a second electrode arranged at a location corresponding to the any one second electrode among the second electrodes included in the adjacent touch area by one second trace.

12. The touch sensor panel of claim 1, wherein a value acquired by multiplying the number of unit cells constituting at least one first electrode connected to a first trace among the first electrodes included in the touch window area and the number of unit cells constituting at least one second electrode connected to a second trace among the second electrodes included in the touch window area is less than a predetermined value.

13. The touch sensor panel of claim 12, wherein the predetermined value is 16.

14. A touch sensor panel comprising:
a plurality of first electrodes and a plurality of second electrodes,
wherein a touch sensor area is constituted by first electrodes included in a first length among the plurality of first electrodes and second electrodes included in a second length among the plurality of second electrodes, and
a pair of a predetermined first electrode among the first electrodes included in the touch window area and a predetermined second electrode among the second electrodes do not exist in other window areas other than the window area.

15. The touch sensor panel of claim 14, wherein the predetermined first electrode and the predetermined second electrode are arranged to be spaced apart by a predetermined distance.

16. The touch sensor panel of claim 14, wherein each of the first length and the second length is 16 mm.

* * * * *